United States Patent
Choi et al.

(10) Patent No.: US 8,451,788 B2
(45) Date of Patent: May 28, 2013

(54) METHOD FOR ALLOCATING PREAMBLE SEQUENCE SUBBLOCK FOR SUPPORTING IRREGULAR SYSTEM BANDWIDTH IN WIRELESS COMMUNICATION SYSTEM AND AN APPARATUS THEREFOR

(75) Inventors: Jin Soo Choi, Anyang-si (KR); Han Gyu Cho, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 457 days.

(21) Appl. No.: 12/774,885

(22) Filed: May 6, 2010

(65) Prior Publication Data

US 2011/0086645 A1    Apr. 14, 2011

Related U.S. Application Data

(60) Provisional application No. 61/250,578, filed on Oct. 12, 2009, provisional application No. 61/250,875, filed on Oct. 13, 2009, provisional application No. 61/250,874, filed on Oct. 13, 2009, provisional application No. 61/254,736, filed on Oct. 25, 2009, provisional application No. 61/257,846, filed on Nov. 4, 2009.

(30) Foreign Application Priority Data

Mar. 24, 2010    (KR) ................. 10-2010-0026267

(51) Int. Cl.
*H04W 4/00*    (2009.01)
(52) U.S. Cl.
USPC .......................................... 370/329; 370/312

(58) Field of Classification Search
USPC .............. 370/310, 312, 328, 329, 349, 471, 370/474
See application file for complete search history.

(56) References Cited

U.S. PATENT DOCUMENTS

| | | |
|---|---|---|
| 2006/0018251 A1 | 1/2006 | Park et al. |
| 2006/0256709 A1 | 11/2006 | Yang |
| 2008/0039107 A1 | 2/2008 | Ma et al. |
| 2010/0226322 A1* | 9/2010 | Choi et al. ................. 370/329 |
| 2010/0309849 A1* | 12/2010 | Park et al. ................. 370/328 |
| 2011/0007690 A1* | 1/2011 | Chang et al. .............. 370/328 |
| 2011/0044244 A1* | 2/2011 | Etemad ..................... 370/328 |
| 2011/0134825 A1* | 6/2011 | Kim et al. .................. 370/312 |
| 2012/0015645 A1* | 1/2012 | Moon et al. ............... 455/422.1 |
| 2012/0177145 A1* | 7/2012 | Han et al. .................. 375/308 |

FOREIGN PATENT DOCUMENTS
WO    2009/114478    9/2009

* cited by examiner

*Primary Examiner* — Kwang B Yao
*Assistant Examiner* — Nguyen Ngo
(74) *Attorney, Agent, or Firm* — Lee, Hong, Degerman, Kang & Waimey

(57) ABSTRACT

A method for transmitting a secondary advanced-preamble (SA-preamble) from a base station in a wireless communication system is disclosed, wherein the SA-preamble supporting an irregular system bandwidth. The method comprises allocating a plurality of sequence subblocks corresponding to a regular system bandwidth; configuring the SA-preamble by dropping one or more sequence subblock pairs among the plurality of sequence subblocks symmetrically in base of a DC component; and transmitting the SA-preamble to a mobile station, wherein a bandwidth of the SA-preamble is same as or narrower than the irregular system bandwidth.

20 Claims, 13 Drawing Sheets

FIG. 11
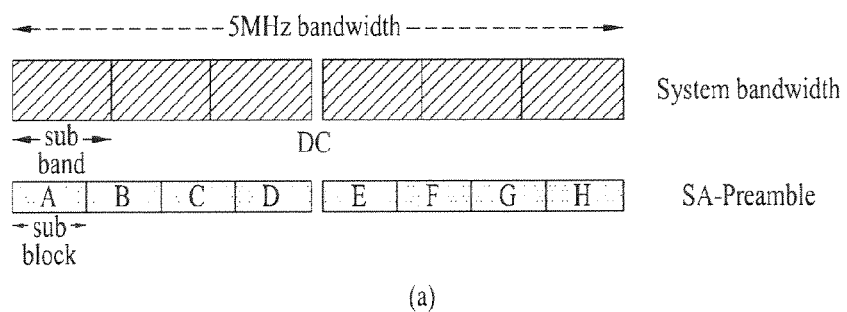
(a)
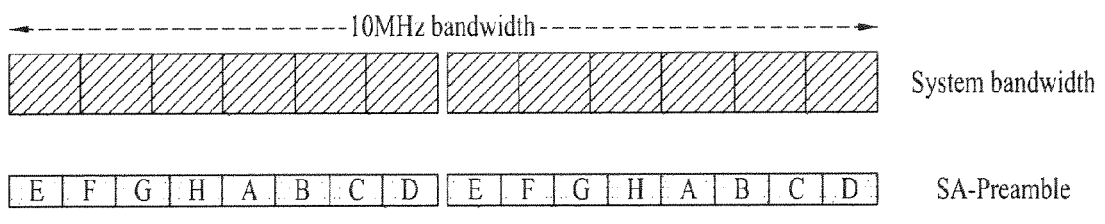
(b)

METHOD FOR ALLOCATING PREAMBLE SEQUENCE SUBBLOCK FOR SUPPORTING IRREGULAR SYSTEM BANDWIDTH IN WIRELESS COMMUNICATION SYSTEM AND AN APPARATUS THEREFOR

This application claims the benefit of U.S. Provisional Patent Application Nos. 61/250,578, filed on Oct. 12, 2009, 61/250,875, filed on Oct. 13, 2009, 61/250,874, filed on Oct. 13, 2009, 61/254,736, filed on Oct. 25, 2009, and 61/257,846, filed on Nov. 4, 2009 and claims the benefit of earlier filing date and right of priority to Korean Patent Application No. 10-2010-0026267, filed on Mar. 24, 2010, the contents of all of which are hereby incorporated by reference as if fully set forth herein.

BACKGROUND OF THE INVENTION

1. Field of the Invention

The present invention relates a wireless communication system, and more particularly, to a method for allocating a preamble sequence subblock for supporting an irregular system bandwidth in a wireless communication system and an apparatus therefor.

2. Discussion of the Related Art

FIG. 1 is a diagram illustrating a wireless communication system. Referring to FIG. 1, a wireless communication system 100 includes a plurality of base stations 110 and a plurality of mobile stations 120. The wireless communication system 100 can include a homogeneous network or a heterogeneous network. In this case, a network where different network entities coexist, such as a macro cell, a femto cell, a pico cell, and a relay station, is designated as the heterogeneous network. The base stations are fixed stations that perform communication with a mobile station. Each of the base stations 110a, 110b, and 110c provides a service to specific local regions 102a, 102b, and 102c. In order to improve system throughput, the specific regions can be divided into a plurality of smaller regions 104a, 104b and 104c. Each of the smaller regions may be designated as a cell, sector or segment. In case of the IEEE (Institute of Electrical and Electronics Engineers) 802.16 system, cell identity is given based on the whole system. On the other hand, sector or segment identity is given based on the specific region where each base station provides a service, and has a value of 0 to 2. The mobile stations 120 can generally be distributed, fixed or moved in the wireless communication system. Each mobile station can perform communication with one or more base stations through an uplink (UL) and a downlink (DL) at a random time. The base station and the mobile station can perform communication with each other by using FDMA (Frequency Division Multiple Access), TDMA (Time Division Multiple Access), CDMA (Code Division Multiple Access), SC-FDMA (Single Carrier-FDMA), MC-FDMA (Multi Carrier-FDMA), OFDMA (Orthogonal Frequency Division Multiple Access) or their combination. Herein, the uplink means a communication link from the mobile station to the base station while the downlink means a communication link from the base station to the mobile station.

SUMMARY OF THE INVENTION

Accordingly, the present invention directed to a method for allocating a preamble sequence subblock for supporting an irregular system bandwidth in a wireless communication system and an apparatus therefor, which substantially obviate one or more problems due to limitations and disadvantages of the related art.

An object of the present invention is to provide a method for allocating a preamble sequence subblock for supporting an irregular system bandwidth in a wireless communication system and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method for transmitting a secondary advanced-preamble (SA-preamble) from a base station in a wireless communication system, the SA-preamble supporting an irregular system bandwidth, the method comprises allocating a plurality of sequence subblocks corresponding to a regular system bandwidth; configuring the SA-preamble by dropping one or more sequence subblock pairs among the plurality of sequence subblocks symmetrically in base of a DC component; and transmitting the SA-preamble to a mobile station, wherein a bandwidth of the SA-preamble is same as or narrower than the irregular system bandwidth.

Preferably, the irregular system bandwidth is configured by droping one or more subband pairs included in the regular system bandwidth symmetrically in base of a DC component. The SA-preamble is configured based on a plurality of sequence subblocks corresponding to a regular system bandwidth of 10 MHz if the irregular system bandwidth is 5 MHz to 10 MHz, and is configured based on a plurality of sequence subblocks corresponding to a regular system bandwidth of 20 MHz if the irregular system bandwidth is 10 MHz to 20 MHz.

More preferably, the SA-preamble includes the same number of sequence subblocks at both sides in base of a DC component. The bandwidth of the SA-preamble is configured by granularity of 2 subblock (1.25 MHz). Meanwhile, the irregular system bandwidth is configured by granularity of 2 subband (1.66 MHz).

In another aspect of the present invention, a base station comprises a processor allocating a plurality of sequence subblocks corresponding to a regular system bandwidth and configuring a secondary advanced-preamble (SA-preamble) by dropping one or more sequence subblock pairs among the plurality of sequence subblocks symmetrically in base of a DC component; and a transmitting module transmitting the SA-preamble to a mobile station, wherein a bandwidth of the SA-preamble is same as or narrower than an irregular system bandwidth.

Preferably, wherein the irregular system bandwidth is configured by droping one or more subband pairs included in the regular system bandwidth symmetrically in base of a DC component. The SA-preamble is configured based on a plurality of sequence subblocks corresponding to a regular system bandwidth of 10 MHz if the irregular system bandwidth is 5 MHz to 10 MHz, and is configured based on a plurality of sequence subblocks corresponding to a regular system bandwidth of 20 MHz if the irregular system bandwidth is 10 MHz to 20 MHz.

More preferably, the SA-preamble includes the same number of sequence subblocks at both sides based on a DC component. The bandwidth of the SA-preamble is configured by granularity of 2 subblock (1.25 MHz). The irregular system bandwidth is configured by granularity of 2 subband (1.66 MHz).

In still another aspect of the present invention, a mobile station comprises a receiving module receiving a primary advanced-preamble (PA-preamble) indicating an irregular system bandwidth from a base station and receiving a secondary advanced-preamble (SA-preamble) corresponding to the irregular system bandwidth; and a processor determining a cell identifier of the base station by using the SA-preamble, wherein a bandwidth of the SA-preamble is same as or narrower than the irregular system bandwidth.

Preferably, the SA-preamble is configured by dropping one or more subblock pairs among a plurality of sequence subblocks corresponding to a regular system bandwidth symmetrically in base of a DC component.

In this case, the irregular system bandwidth is configured by dropping one or more subband pairs at the regular system bandwidth symmetrically in base of a DC component. The SA-preamble is configured based on a plurality of sequence subblocks corresponding to a regular system bandwidth of 10 MHz if the irregular system bandwidth is 5 MHz to 10 MHz, and is configured based on a plurality of sequence subblocks corresponding to a regular system bandwidth of 20 MHz if the irregular system bandwidth is 10 MHz to 20 MHz.

More preferably, the SA-preamble includes the same number of sequence subblocks at both sides in base of a DC component. The bandwidth of the SA-preamble is configured by granularity of 2 subblock (1.25 MHz). The irregular system bandwidth is configured by granularity of 2 subband (1.66 MHz).

In further still another aspect of the present invention, in a method for receiving a secondary advanced-preamble (SA-preamble) in a mobile station of a wireless communication system, the SA-preamble supporting an irregular system bandwidth, the method comprises receiving a primary advanced-preamble (PA-preamble) indicating the irregular system bandwidth from a base station; and receiving a secondary advanced-preamble (SA-preamble) corresponding to the irregular system bandwidth, wherein a bandwidth of the SA-preamble is same as or narrower than the irregular system bandwidth. Preferably, the SA-preamble is configured by dropping one or more subblock pairs among a plurality of sequence subblocks corresponding to a regular system bandwidth symmetrically in base of a DC component.

In this case, the irregular system bandwidth is configured by dropping one or more subband pairs at the regular system bandwidth symmetrically in base of a DC component. The SA-preamble is configured based on a plurality of sequence subblocks corresponding to a regular system bandwidth of 10 MHz if the irregular system bandwidth is 5 MHz to 10 MHz, and is configured based on a plurality of sequence subblocks corresponding to a regular system bandwidth of 20 MHz if the irregular system bandwidth is 10 MHz to 20 MHz.

More preferably, the SA-preamble includes the same number of sequence subblocks at both sides in base of a DC component. Also, the bandwidth of the SA-preamble is configured by granularity of 2 subblock (1.25 MHz). The irregular system bandwidth is configured by granularity of 2 subband (1.66 MHz).

According to the embodiments of the present invention, a preamble sequence subblock for supporting an irregular system bandwidth can be allocated efficiently in the IEEE 802.16m wireless communication system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram illustrating a general configuration of SA-preamble in a regular system bandwidth;

DETAILED DESCRIPTION OF THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to a system that uses a plurality of orthogonal subcarriers. For convenience, the present invention will be described based on the IEE 802.16 system. However, the IEEE 802.16 system is only exemplary, and the present invention can be applied to various wireless communication systems including a $3^{rd}$ generation partnership project (3GPP) system.

Figure 1:
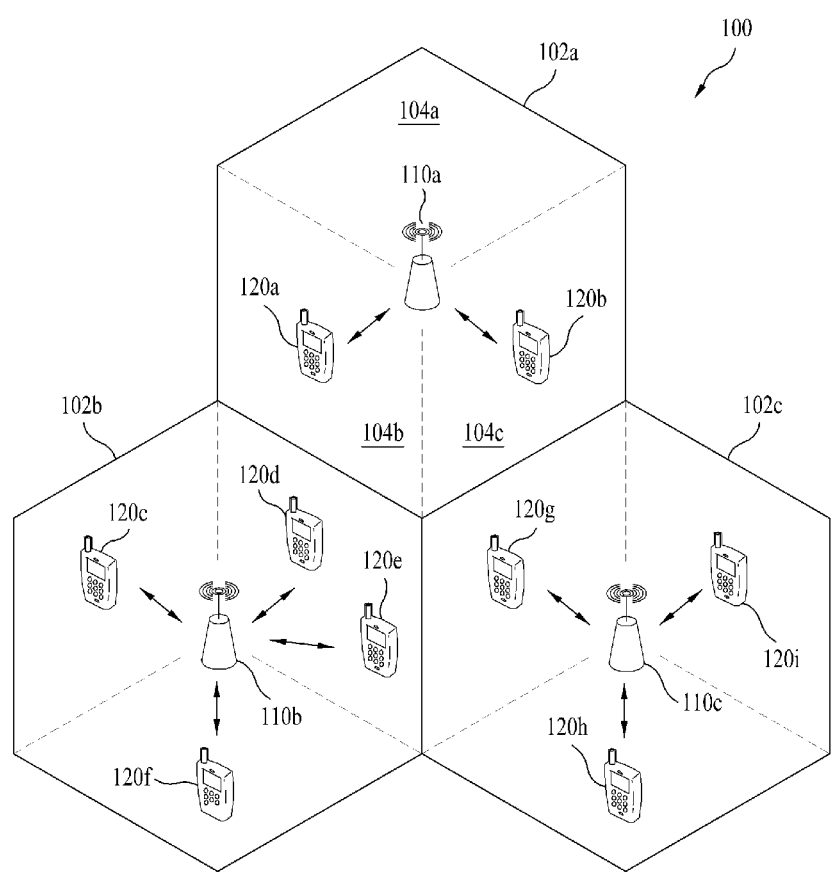
FIG. 1 is a diagram illustrating a wireless communication system.
Figure 2:
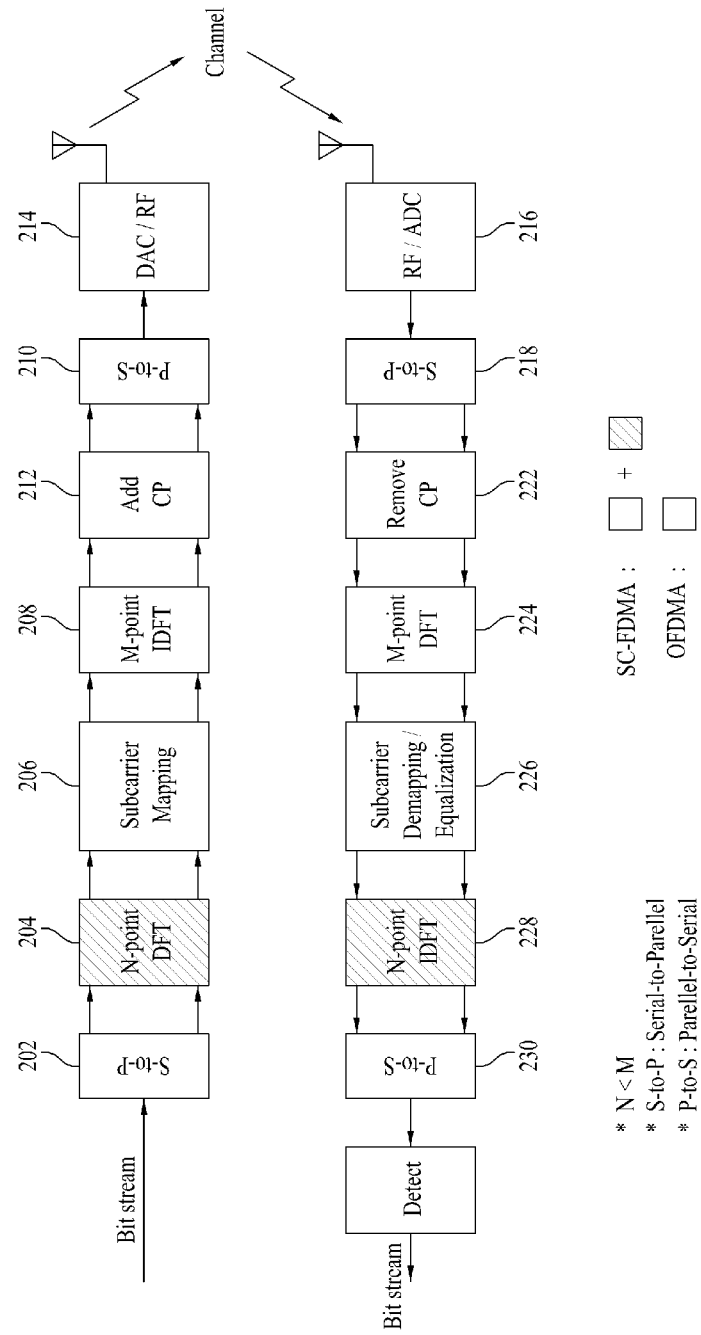
FIG. 2 is a diagram illustrating a transmitter and a receiver for OFDMA and SC-FDMA.

FIG. 2 is a block diagram illustrating a transmitter and a receiver for OFDMA and SC-FDMA. In an uplink, a transmitter may be a part of a mobile station, and a receiver may be a part of a base station. In a downlink, a transmitter may be a part of a base station, and a receiver may be a part of a mobile station.

Referring to FIG. 2, an OFDMA transmitter includes a serial to parallel converter 202, a sub-carrier mapping module 206, an M-point inverse discrete fourier transform (IDFT) module 208, a cyclic prefix (CP) addition module 210, a parallel to serial converter 212, and a radio frequency (RF)/digital to analog converter (DAC) module 214.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from a medium access control (MAC) layer. The bit streams may be designated as codewords, and are equivalent to the data block transferred from the MAC layer. The data block transferred from the MAC layer may be designated as a transmission block. Examples of a modulation scheme include, but not limited to, BPSK (binary phase shift keying), QPSK (quadrature phase shift keying), and n-QAM (quadrature amplitude modulation). The data symbol sequences in series are converted to parallel data symbol sequences as much as N (202). N number of data symbols are mapped with N number of subcarriers allocated among a total of M number of subcarriers, and the other M-N number of carriers are padded with 0 (206). The data symbols mapped in a frequency domain are converted to time domain sequences through M-point IDFT processing (S208). Afterwards, in order to reduce inter-symbol interference (ISI) and inter-carrier interference (ICI), cyclic prefix is added to the time domain sequences to generate OFDMA symbols (210). The generated OFDMA symbols are converted from parallel symbols to serial symbols (212). Then, the OFDMA symbols are transmitted to the receiver through digital-to-analog conversion and frequency uplink conversion (214). Other user is allocated with available subcarriers among the remaining M-N number of subcarriers. On the other hand, the OFDMA receiver includes an RF/ADC (analog to digital converter) module 216, a serial-to-parallel converter 218, a cyclic prefix (CP) removing module 220, an M-point discrete fourier transform (DFT) module 224, a subcarrier demapping/equalization module 226, a parallel-to-digital converter 228, and a detection module 230. A signal processing procedure of the OFDMA receiver will be configured in reverse order of the OFDMA transmitter.

Meanwhile, as compared with the OFDMA transmitter, the SC-FDMA transmitter additionally includes an N-point DFT module 204 prior to the subcarrier mapping module 206. The SC-FDMA transmitter can reduce a peak-to-average power ratio (PAPR) of a transmitting signal more remarkably than the OFDMA transmitter by spreading a plurality of data to the frequency domain through DFT prior to IDFT processing. Also, as compared with the OFDMA receiver, the SC-FDMA receiver additionally includes an N-point IDFT module 228 after the subcarrier demapping module 226. A signal processing procedure of the SC-FDMA receiver will be configured in reverse order of the SC-FDMA transmitter.

The modules illustrated in FIG. 2 are illustrative, and the transmitter and/or the receiver may further include necessary modules. Some modules/functions may be omitted or may be divided into different modules, and two or more modules may be incorporated into one module.

Figure 3:
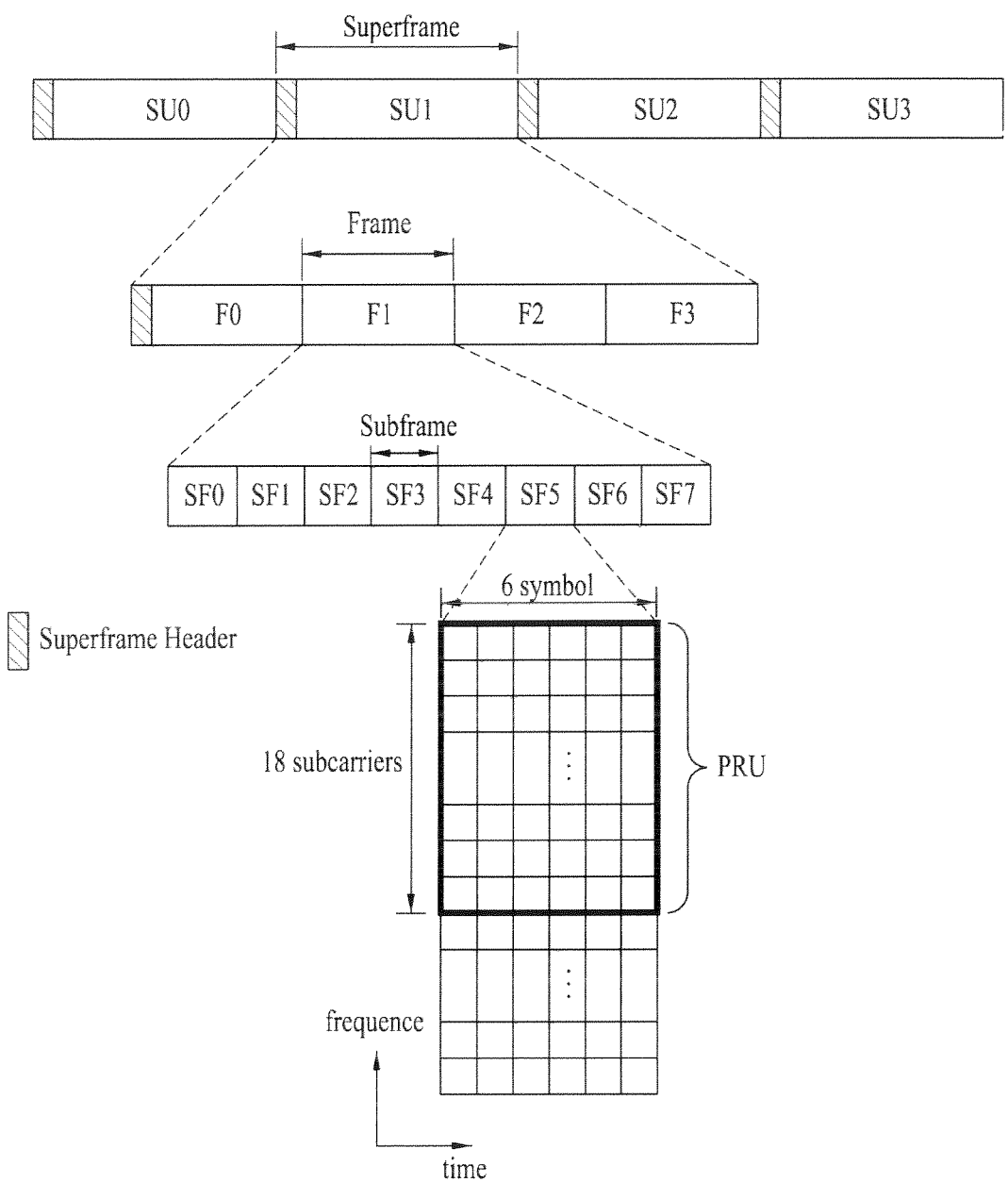
FIG. 3 is a diagram illustrating an example of a structure of a radio frame in an IEEE 802.16m system.

FIG. 3 is a diagram illustrating a structure of a radio frame in an IEEE 802.16m system. The structure of the radio frame can be applied to FDD (Frequency Division Duplex), H-FDD (Half Frequency Division Duplex), TDD (Time Division Duplex), etc.

Referring to FIG. 3, the radio frame includes superframes SU0 to SU3 of 20 ms that support bandwidths of 5 MHz, 8.75 MHz, 10 MHz or 20 MHz. Each superframe includes four frames F0 to F3 of 5 ms having the same size, and starts with a super frame header (SFH). The super frame header carries essential system parameter and system configuration information.

Each frame includes eight subframes SF0 to SF7. The subframe is allocated for downlink or uplink transmission. The subframe includes a plurality of OFDM symbols in a time domain and a plurality of subcarriers in a frequency domain. The OFDM symbols may be referred to as OFDMA symbols or SC-FDMA symbols depending on a multiplexing access mode. The number of OFDM symbols included in the subframe can be varied depending on channel bandwidth and CP length.

The OFDM symbol includes a plurality of subcarriers, and the number of subcarriers is determined depending on the size of fast fourier transform (FFT). The subcarriers can be divided into data subcarriers for data transmission, pilot subcarriers for channel measurement, and null subcarriers for guard band and DC components. Examples of parameters for the OFDM symbols include BW, $N_{used}$, n, G, etc. The BW is a nominal channel bandwidth. $N_{used}$ is the number of subcarriers used for signal transmission. n is a sampling factor, and determines subcarrier spacing and useful symbol time together with BW and $N_{used}$. G is a ratio between CP time and useful time.

Table 1 illustrates an example of OFDMA parameters.

TABLE 1

| The nominal channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$ (kHz) | | | 10.94 | 7.81 | 9.77 | 10.94 | 10.94 |
| Useful symbol time, $T_b$ (µs) | | | 91.4 | 128 | 102.4 | 91.4 | 91.4 |
| CP ratio, G = 1/8 | OFDMA symbol time, $T_s$ (µs) | | 102.857 | 144 | 115.2 | 102.857 | 102.857 |
| | FDD | Number of OFDMA symbols per 5 ms frame | 48 | 34 | 43 | 48 | 48 |
| | | Idle time (µs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (µs) | 165.714 | 248 | 161.6 | 165.714 | 165.714 |
| CP ratio, G = 1/16 | OFDMA symbol time, $T_s$ (µs) | | 97.143 | 136 | 108.8 | 97.143 | 97.143 |
| | FDD | Number of OFDMA symbols per 5 ms frame | 51 | 36 | 45 | 51 | 51 |
| | | Idle time (µs) | 45.71 | 104 | 104 | 45.71 | 45.71 |
| | TDD | Number of | 50 | 35 | 44 | 50 | 50 |

TABLE 1-continued

|  |  |  | | | | | |
|---|---|---|---|---|---|---|---|
| | | OFDMA symbols per 5 ms frame TTG + RTG (µs) | 142.853 | 240 | 212.8 | 142.853 | 142.853 |
| CP ratio, G = 1/4 | | OFDMA symbol time, $T_s$ (µs) | 114.286 | 160 | 128 | 114.286 | 114.286 |
| | FDD | Number of OFDMA symbols per 5 ms frame | 43 | 31 | 39 | 43 | 43 |
| | | Idle time (µs) | 85.694 | 40 | 8 | 85.694 | 85.694 |
| | TDD | Number of OFDMA symbols per 5 ms frame | 42 | 30 | 38 | 42 | 42 |
| | | TTG + RTG (µs) | 199.98 | 200 | 136 | 199.98 | 199.98 |
| Number of Guard Sub-Carriers | | Left | 40 | 80 | 80 | 80 | 160 |
| | | Right | 39 | 79 | 79 | 79 | 159 |
| Number of Used Sub-Carriers | | | 433 | 865 | 865 | 865 | 1729 |
| Number of Physical Resource Unit (18 × 6) in a type-1 sub-frame. | | | 24 | 48 | 48 | 48 | 96 |

Figure 4:
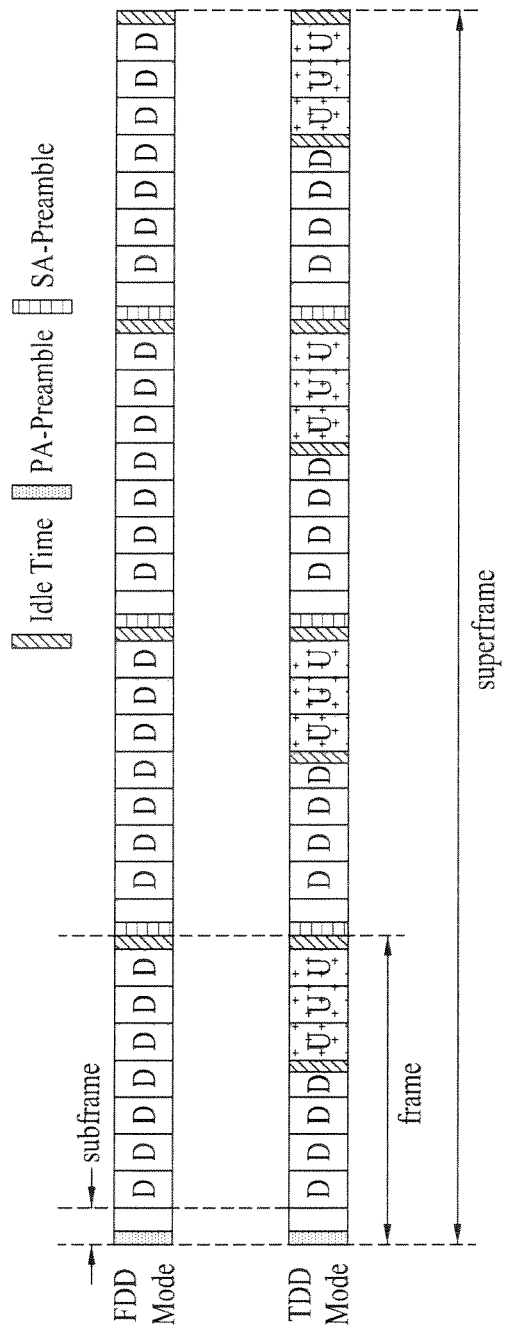
FIG. 4 is a diagram illustrating an example of transmission of a synchronization channel in an IEEE 802.16m system.

FIG. 4 illustrates an example of transmission of a synchronization channel in the IEEE 802.16m system. In this embodiment, IEEE 802.16m only mode is assumed.

Referring to FIG. 4, in the IEEE 802.16m system, four synchronization channels SCH are transmitted to one superframe (SU1~SU4). In the IEEE 802.16m system, a downlink synchronization channel includes a main synchronization channel and a sub synchronization channel, wherein each of the main synchronization channel and the sub synchronization channel includes a primary advanced preamble (PA-preamble) and a secondary advanced preamble (SA-preamble). In an FDD mode and a TDD mode, the downlink synchronization channel can be transmitted through a first OFDMA symbol of a frame.

Figure 5:
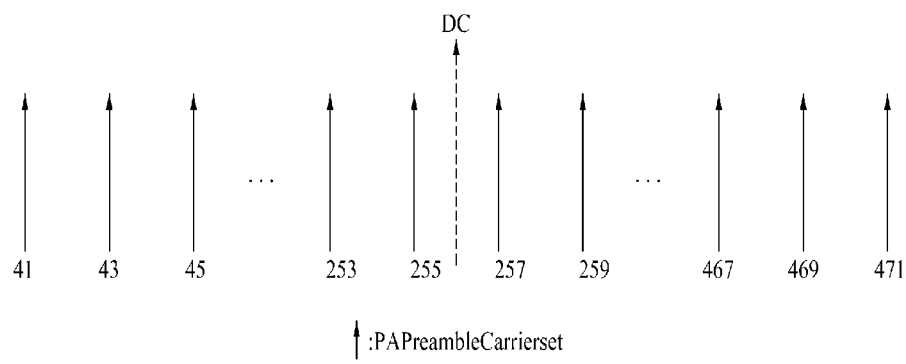
FIG. 5 is a diagram illustrating subcarriers into which PA-preamble is mapped.

Referring to FIG. 5, the PA-preamble has a length of 216 and is not associated with FFT size. The PA-preamble is inserted at an interval of two subcarriers, and 0 is inserted into the other duration. For example, the PA-preamble can be inserted into subcarriers of 41, 43, . . . , 469. The PA-preamble can carry information such as system bandwidth information and carrier configuration information. If subcarrier index of 256 is reserved to DC, subcarrier into which sequence is mapped can be determined using the following Equation 1.

$$PAPreambleCarrierSet = 2 \times k + 41 \qquad \text{[Equation 1]}$$

In this Equation 1, k represents an integer between 0 and 215.

For example, QPSK type sequence having a length of 216 as suggested in Table 2 can be used for the PA-preamble.

TABLE 2

| Index | Carrier | BW | Series to modulate |
|---|---|---|---|
| 0 | Fully configured | 5 MHz | 6DB4F3B16BCE59166C9CEF7C3C8CA5EDFC16 A9D1DC01F2AE6AA08F |
| 1 | | 7, 8.75 and 10 MHz | 1799628F3B9F8F3B22C1BA19EAF94FEC4D37D EE97E027750D298AC |
| 2 | | 20 MHz | 92161C7C19BB2FC0ADE5CEF3543AC1B6CE6B E1C8DCABDDD319EAF7 |
| 3 | | Reserved | 6DE116E665C395ADC70A89716908620868A603 40BF35ED547F8281 |
| 4 | | Reserved | BCFDF60DFAD6B027E4C39DB20D783C9F4671 55179CBA31115E2D04 |
| 5 | | Reserved | 7EF1379553F9641EE6ECDBF5F144287E329606 C616292A3C77F928 |
| 6 | | Reserved | 8A9CA262B8B3D37E3158A3B17BFA4C9FCFF4 D396D2A93DE65A0E7C |
| 7 | | Reserved | DA8CE648727E4282780384AB53CEEBD1CBF79 E0C5DA7BA85DD3749 |
| 8 | | Reserved | 3A65D1E6042E8B8AADC701E210B5B4B650B6 AB31F7A918893FB04A |
| 9 | | Reserved | D46CF86FE51B56B2CAA84F26F6F204428C1BD 23F3D888737A0851C |
| 10 | Partially configured | N/A | 640267A0C0DF11E475066F1610954B5AE55E189 EA7E72EFD57240F |

The PA-preamble is used to acquire some information such as system frequency bandwidth information and carrier configuration information. The SA-preamble is used to allow the mobile station to acquire cell identifier and measure received signal strength indication (RSSI). The PA-preamble can be transmitted through a first frame F0, and the SA-preamble can be transmitted through second to fourth frames F01~F03.

FIG. 5 illustrates subcarriers into which PA-preamble is mapped.

Figure 6:
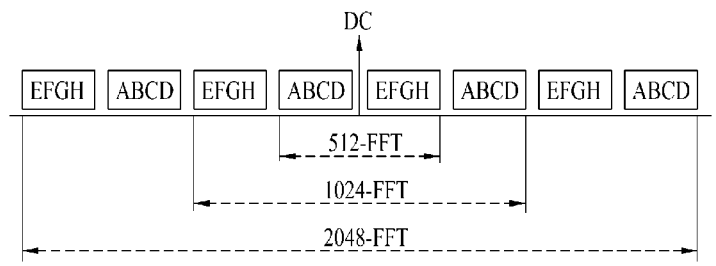
FIG. 6 is a diagram illustrating SA-preamble mapped into a frequency domain.

FIG. 6 illustrates an example of SA-preamble mapped into a frequency domain.

Referring to FIG. 6, the number of subcarriers allocated to the SA-preamble can be varied depending on the FFT size. For example, the length of the SA-preamble could be 144, 288, and 576, respectively, for 512-FFT, 1024-FFT, and 2048-FFT. If the subcarriers of 256, 512, and 1024 are respectively reserved to DC component for 512-FFT, 1024-FFT and 2048-FFT, the subcarriers allocated to the SA-preamble can be determined depending on the following Equation 2.

$$SAPreambleCarrierSet_n = n + 3 \cdot k + 40 \cdot \frac{N_{SAP}}{144} + \left\lfloor \frac{2 \cdot k}{N_{SAP}} \right\rfloor \quad \text{[Equation 2]}$$

In this Equation 2, n is SA-preamble carrier set index, has a value of 0, 1, or 2, and represents segment ID. $N_{SAP}$ represents the number of subcarriers allocated to the SA-preamble, and k represents an integer between 0 and $N_{SAP}-1$.

Each cell has a cell ID (IDCell) represented by an integer between 0 and 767. Cell ID is defined by segment index and index given per segment. Generally, cell ID can be determined by the following Equation 3.

$$IDcell = 256 \times n + Idx \quad \text{[Equation 3]}$$

In this Equation 3, n is SA-preamble carrier set index, has a value of 0, 1 or 2, and represents segment ID. Idx represents an integer between 0 and 255 and is determined by the following Equation 4.

$$Idx = 2 \cdot \mathrm{mod}(q, 128) + \left\lfloor \frac{q}{128} \right\rfloor \quad \text{[Equation 4]}$$

In this Equation 4, sequence index q is an integer between 0 and 255, and is acquired from the SA-preamble sequence.

In case of 512-FFT, the SA-preamble of 288 bits, is divided into eight sequence subblocks (i.e., A, B, C, D, E, F, G and H), each of which has a length of 36 bits. Each segment ID has its respective sequence subblock different from that of another segment ID.

The SA-preamble defined in the 802.16m system will be described in detail later. In case of 512-FFT, A, B, C, D, E, F, G and H are modulated in due order and then mapped into SA-preamble subcarrier set corresponding to segment ID. If FFT size is increased, basic blocks A, B, C, D, E, F, G, and H are repeated in the same order. For example, in case of 1024-FFT, E, F, G, H, A, B, C, D, E, F, G, H, A, B, C, and D are modulated in due order and then mapped into SA-preamble subcarrier set corresponding to segment ID.

Cyclic shift (circular shift) can be applied to three continuous subcarriers after subcarrier mapping according to the Equation 2. The respective subblocks have the same offset, and a cyclic shift pattern of each subblock is [2,1,0, . . . , 2,1, 0, . . . , 2,1,0, 2,1,0, DC,1,0,2,1,0,2, . . . , 1,0,2, . . . , 1,0,2]. In this case, shift includes right cyclic shift.

Figure 7:
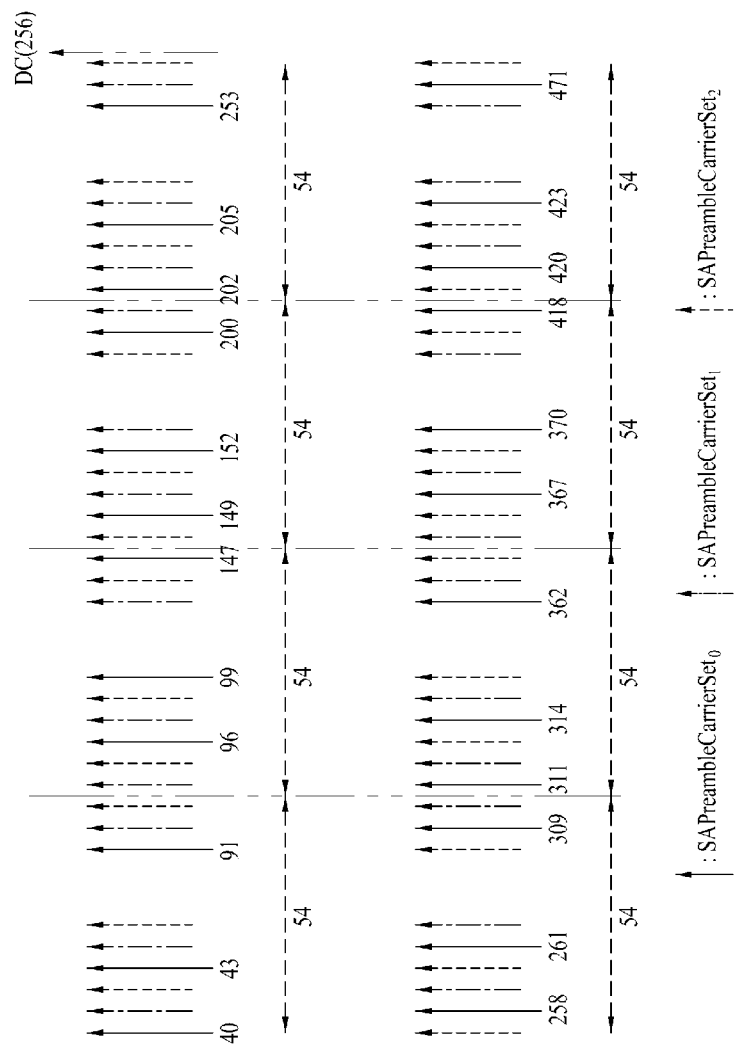
FIG. 7 is a diagram illustrating a structure of SA-preamble in a frequency domain for 512-FFT.

The structure of the SA-preamble in the frequency domain for 512-FFT is shown in FIG. 7. In case of 512-FFT, the blocks A, B, C, D, E, F, G, and H can undergo right cyclic shift.

Figure 8:
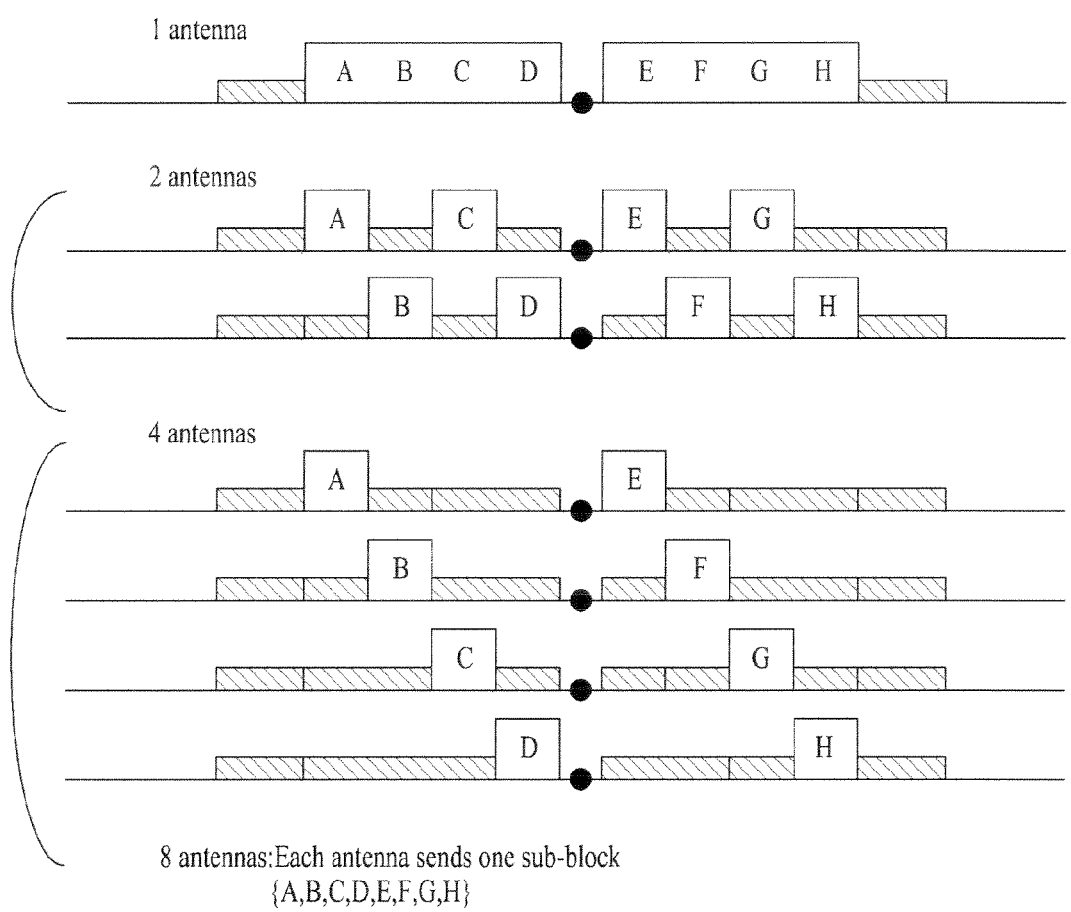
FIG. 8 to FIG. 10 are diagrams illustrating a structure of SA-preamble in a multi-antenna system.
Figure 9:
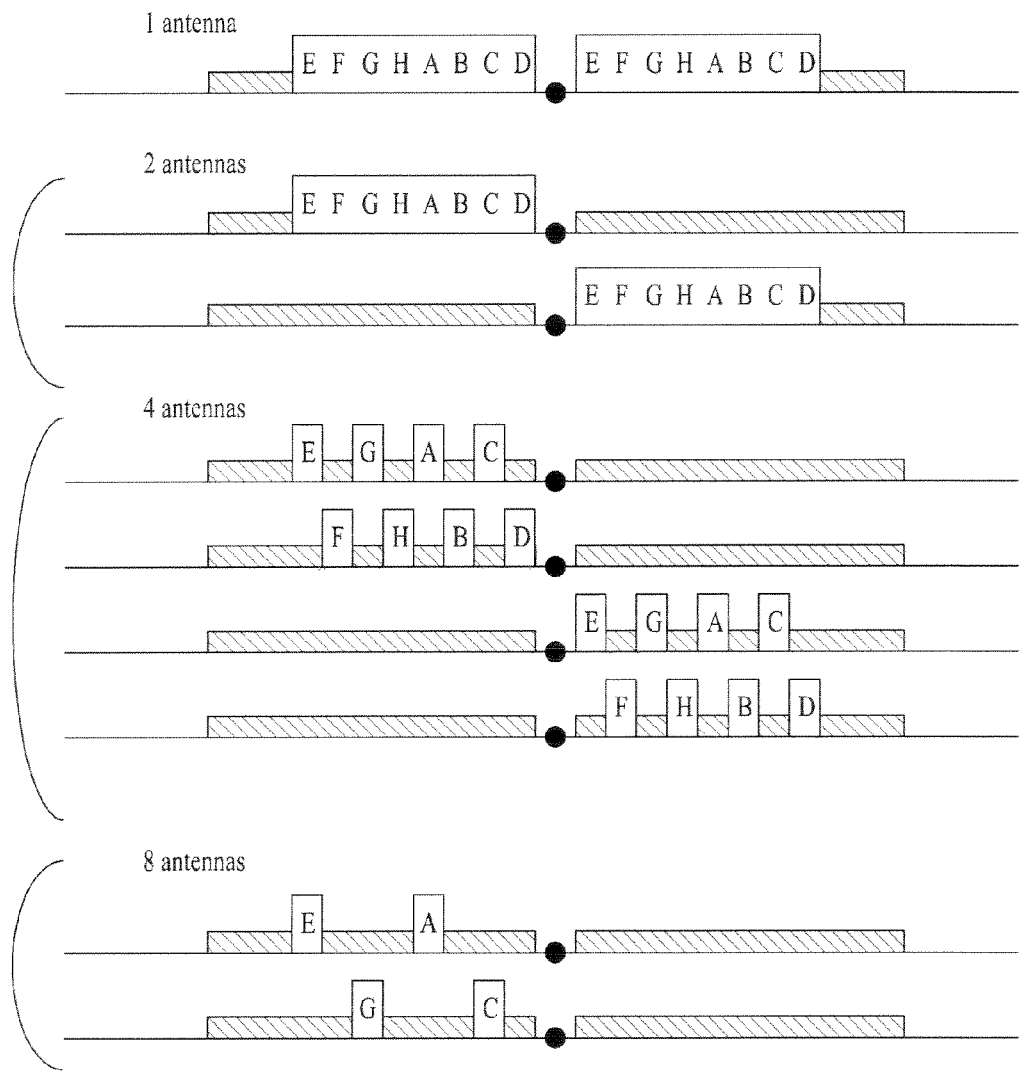
Figure 10:
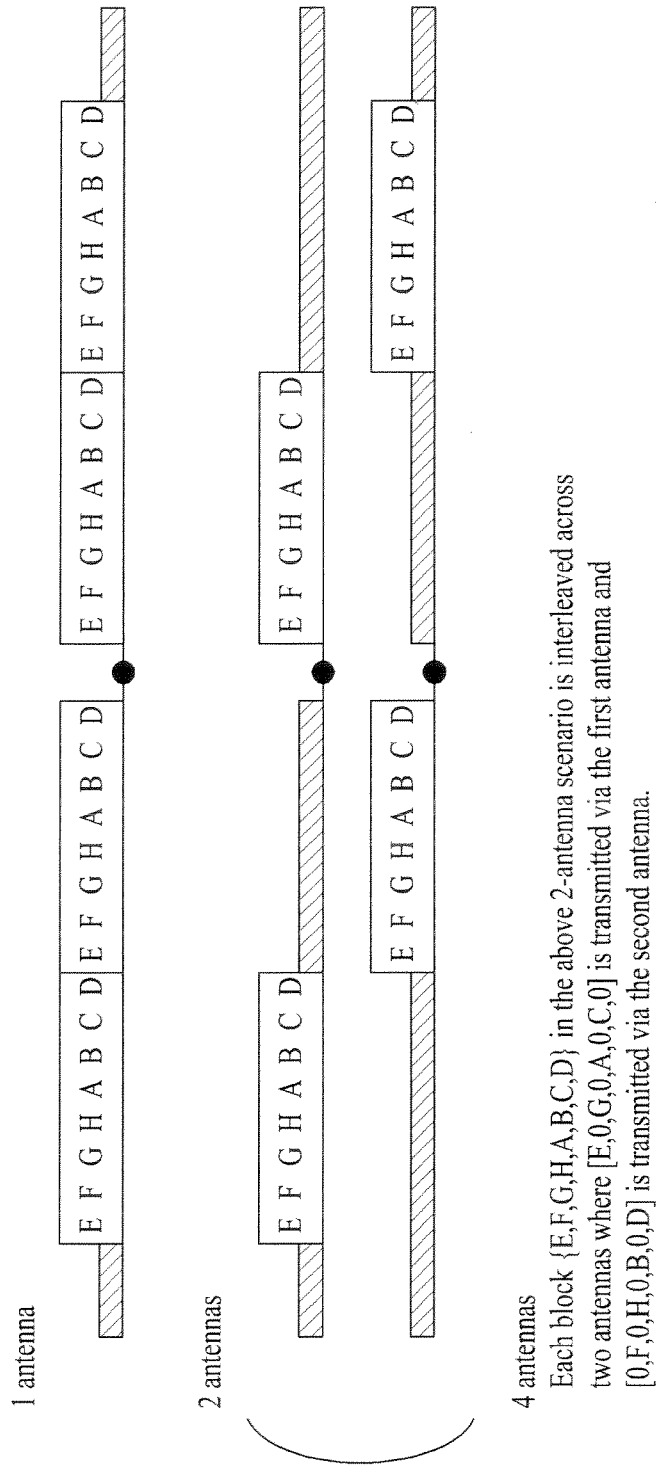

FIG. 8 to FIG. 10 are diagrams illustrating a structure of SA-preamble in a multi-antenna system. In particular, FIG. 8 to FIG. 10 respectively illustrate 512-FFT, 1024-FFT, and 2048-FFT.

Referring to FIG. 8 to FIG. 10, the SA-preamble can be interleaved on a plurality of antennas. A method for interleaving the SA-preamble is not limited especially. For example, if a multi-antenna system has $2^n$ number of transmitting antennas, the SA-preamble can be interleaved in a manner illustrated in Table 3. For convenience, eight continuous subblocks {E,F,G,H,A,B,C,D} will be designated as a block, and each symbol will be defined as follows.

$N_t$: the number of transmitting antennas
$N_b$: a total number of blocks
$N_s$: a total number of subblocks ($8 \times N_b$)
$N_{bt}$: the number of blocks per antenna ($N_b/N_t$)
$N_{st}$: the number of subblocks per antenna ($N_s/N_t$)

TABLE 3

If ($N_{bt} >= 1$)
  Continuous blocks are distributed in $N_t$ number of antennas.
    Blocks are repeated in a period of $N_t$ in a given antenna.
    The location of block in the (t+1)th antenna=t+p×$N_t$
    In this case, t = 0, 1, 2, ..., $N_t$−1, p = 0, 1, 2, ..., $N_{bt}$−1.
Else If ($N_{st}$ = 4).
  Subblocks {E,F,G,H,A,B,C,D} are interleaved in two continuous antennas.
    Blocks [E,0,G,0,A,0,C,0] are allocated from block location floor (i/2) to antenna i.
    Blocks [0,F,0,H,0,B,0,D] are allocated from block location floor ((i+1)/2) to antenna i+1.
    In this case, i = 0, 2, 4, ..., $N_t$
  Else If ($N_{st}$ = 2)
  Subblocks {E,F,G,H,A,B,C,D} are interleaved in four continuous antennas.
    Blocks [E,0,0,0,A,0,0,0] are allocated from block location floor (i/4) to antenna i.
    Blocks [0,0,G,0,0,0,C,0] are allocated from block location floor ((i+1)/4) to antenna i+1.
    Blocks [0,F,0,0,0,B,0,0] are allocated from block location floor ((i+2)/4) to antenna i+2.
    Blocks [0,0,0,H,0,0,0,D] are allocated from block location floor ((i+3)/4) to antenna i+3.
    In this case, i = 0, 4, 8, ..., $N_t$
  Else
    Subblocks {E,F,G,H,A,B,C,D} are interleaved in eight continuous antennas.
    Blocks [E,0,0,0,0,0,0,0] are allocated from block location floor (i/8) to antenna i.
    Blocks [0,F,0,0,0,0,0,0] are allocated from block location floor((i+1)/8) to antenna i+1.
    Blocks [0,0,G,0,0,0,0,0] are allocated from block location floor ((i+2)/8) to antenna i+2.
    Blocks [0,0,0,H,0,0,0,0] are allocated from block location floor ((i+3)/8) to antenna i+3.
    Blocks [0,0,0,0,A,0,0,0] are allocated from block location floor ((i+4)/8) to antenna i+4.
    Blocks [0,0,0,0,0,B,0,0] are allocated from block location floor ((i+5)/8) to antenna i+5.
    Blocks [0,0,0,0,0,0,C,0] are allocated from block location floor ((i+6)/8) to antenna i+6.
    Blocks [0,0,0,0,0,0,0,D] are allocated from block location floor ((i+7)/8) to antenna i+7.
    In this case, i = 0, 8, ..., $N_t$ A transmission structure at each frame can be rotated within the transmitting antennas. For example, considering 512-FFT system having four antennas, at the fth frame, [A,0, 0,0,E,0,0,0] can be transmitted through a first antenna, and [0,0,0,D,0,0,0,H] can be transmitted through a fourth antenna. Afterwards, at the (f+1) frame, [0,0,0,D,0,0,0,H] can be transmitted through the first antenna, and [A,0,0,0,E,0,0,0] can be transmitted through the fourth antenna.

Table 4 to Table 6 respectively illustrate 128 SA-preamble sequences. A parent sequence is indicated by index q and is represented by hexadecimal format. The sequences of Table 4 to Table 6 correspond to segments 0~2, respectively. In Table 4 to Table 6, blk represents a subblock constituting each sequence.

Modulation sequences are obtained by converting hexadecimal sequence $X_i^{(q)}$ (X=A,B,C,D,E,F,G,H) into two QPSK symbols $v_{2i}^{(q)}$ and $v_{2i+1}^{(q)}$. In this case, i represents an integer between 0 and 8, and q represents an integer between 0 and 127. The following Equation 5 represents that $X_i^{(q)}$ is converted into two QPSK symbols.

$$v_{2i}^{(q)} = \exp\left(j\frac{\pi}{2}\left(2 \cdot b_{i,0}^{(q)} + b_{i,1}^{(q)}\right)\right) \quad \text{[Equation 5]}$$

-continued $$v_{2i+1}^{(q)} = \exp\left(j\frac{\pi}{2}(2 \cdot b_{i,2}^{(q)} + b_{i,3}^{(q)})\right)$$

In this case, $X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)}$. By the above Equation, binaries 00, 01, 10 and 11 are converted into 1, j, −1 and −j, respectively. However, this is only exemplary, and $X_i^{(q)}$ can be converted into QPSK symbol by using another similar equation.

For example, if sequence index q is 0, a sequence of sub-block A is 314C8648F, and the sequence is modulated to QPSK signal of [+1 −j +1 +j +j +1 −j +1 −1 +1 +j −1 +j +1 −1 +1 −j −j].

Meanwhile, the 128 sequences illustrated in each of the Tables can be extended two times by complex conjugate operation. In other words, 128 sequences can be generated additionally by complex conjugate operation, and 128 to 255 indexes can be given to the generated sequences. Namely, SA-preamble index of sequence index x corresponding to one segment ID is in complex conjugate relation with SA-preamble sequence of sequence index x+128 corresponding to the one segment ID. The following Equation 6 represents sequence extended from parent sequence by complex conjugate operation.

$$v_k^{(q)} = (v_k^{(q-128)})^* \text{ for } 128 \leq q < 255 \quad [\text{Equation 6}]$$

In this Equation 6, k represents an integer between 0 and $N_{SAP}-1$, and $N_{SAP}$ represents a length of SA-preamble. And, complex conjugate operation (·)* changes a complex signal of a+jb to a complex signal of a−jb, and changes a complex signal of a−jb to a complex signal of a+jb.

TABLE 4 n = 0: (Segment 0)

| q/blk | A | B | C | D | E | F | G | H |
|---|---|---|---|---|---|---|---|---|
| 0 | 314C8648F | 18BC23543 | 06361E654 | 27C552A2D | 3A7C69A77 | 011B29374 | 277D31A46 | 14B032757 |
| 1 | 281E84559 | 1A0CDDF7E | 2473A5D5B | 2C6439AB8 | 1CA9304C1 | 0AC3BECD0 | 34122C7F5 | 25362F596 |
| 2 | 00538AC77 | 38F9CBBC6 | 04DBCCB40 | 33CDC6E42 | 181114BE4 | 0766079FA | 2DD2F5450 | 13E0508B2 |
| 3 | 3BE4056D1 | 2C7953467 | 0E5F0DE66 | 03C9B2E7D | 1857FD2E3 | 15A276D4F | 210F282AF | 27CE61310 |
| 4 | 3DBAAE31E | 254AE8A85 | 168B63A64 | 05FDF74FB | 3948B6856 | 33656C528 | 1799C9BA1 | 004E0B673 |
| 5 | 177CE8FBC | 21CEE7F09 | 397CD6551 | 01D4A1A10 | 1730F9049 | 067D89EA9 | 3AC141077 | 3D7AD6888 |
| 6 | 3B78215A1 | 17F921D66 | 385006FDC | 011432C9D | 24ED16EA6 | 0A54922F1 | 02067E65D | 0FEC2128D |
| 7 | 01FF4E172 | 2A704C742 | 3A58705E1 | 3F3F66CD2 | 07CA4C462 | 1854C8AA3 | 03F576092 | 06A989824 |
| 8 | 1A5B7278E | 1630D0D82 | 3001EF613 | 34CCF51A1 | 2120C250A | 06893FA2D | 156073692 | 07178CFA7 |
| 9 | 032E31906 | 2DD318EAA | 1DE55B14D | 0EF4B6FB3 | 27DED0610 | 1BC8440D3 | 0ED86BF8D | 14FAFDE2C |
| 10 | 174725FFD | 0D2FB1732 | 124470F56 | 292D9912B | 1571408A7 | 227197AE9 | 2430BC576 | 0B67304E0 |
| 11 | 1F1DCD669 | 293DD1701 | 0C34F1B84 | 28496EE51 | 3DC41327F | 071C06523 | 28E1657B6 | 02588EFDA |
| 12 | 22E4AA041 | 3810362F1 | 1955F1DE7 | 0D6D2F8BE | 11F31358E | 3EB27BB12 | 1F4E60111 | 119BDA927 |
| 13 | 14300B522 | 152E6D482 | 168DF6E43 | 0740B7AE0 | 14FE7DCDD | 0FA092626 | 23697615A | 1F1331EB8 |
| 14 | 12C65ED00 | 317643CD7 | 2C637A415 | 15E3E5185 | 0F5CBB9E0 | 23290B156 | 26F37EFE8 | 1AA174793 |
| 15 | 1DD6453F0 | 032C4BD39 | 082659BD5 | 320C5E691 | 224E555B2 | 3A9615A8D | 1BED03424 | 28E6A9CED |
| 16 | 068AE7EE9 | 16F724910 | 3803DD9BD | 2A31A2FFB | 010BF5237 | 33CB067E6 | 0280C28B7 | 184417B94 |
| 17 | 1D651280A | 2C7BCF443 | 17324EFB0 | 236E5C411 | 381215183 | 2F076E64E | 0A6F2EE74 | 3DA4196B7 |
| 18 | 27341650F | 1B520099C | 09AC91114 | 000A5F48B | 30AB4B9B6 | 2D0DB0DE6 | 1CF57978A | 2D424406B |
| 19 | 3A01E2FB2 | 0DF5B257B | 019D1C63A | 0EA7DCDDB | 242D96605 | 2DA675F15 | 1DEC54193 | 3B6341C16 |
| 20 | 2DDFAEB05 | 21D0A1700 | 0FA09BB78 | 17DA7F8BB | 06E883B3F | 02E6B929B | 2C1C413B4 | 030E46DD1 |
| 21 | 1B625E3F9 | 0F708F756 | 00CD97B18 | 3F036B4DF | 2CF08C3E5 | 213A5A681 | 14A298D91 | 3D2ED63BC |
| 22 | 2DA48D5A9 | 0C085BD17 | 01903428A | 3DF2A30D9 | 29061309A | 16F7DC40E | 2AF88A583 | 27C1DA5E9 |
| 23 | 30DBAC784 | 20C3B4C56 | 0F1538CB7 | 0DDE7E1BE | 2C312903B | 0FF21E6C2 | 032C15DE3 | 26C9A6BA4 |
| 24 | 3188E8100 | 385FEFE2D | 3967B56C7 | 3F62D246B | 1826A755E | 2CDA895EA | 2FAB77825 | 1B525FF88 |
| 25 | 339467175 | 2DE49506B | 27B7282A9 | 0254470A3 | 3374310AF | 2DF20FD64 | 3848A6806 | 11C183E49 |
| 26 | 02AFA38DC | 0F2AFDDF4 | 1A05650E2 | 061439F88 | 11C275BE0 | 30C41DEC9 | 119E070E9 | 1E76542C1 |
| 27 | 1B364E155 | 086FF808C | 29F1BA9DC | 0A830C788 | 2E70D0B3A | 34EA776B1 | 3D13615C0 | 15FC708D4 |
| 28 | 38ECFC198 | 07034E9B3 | 2340F86B3 | 07562464C | 22823E455 | 1F68D29E9 | 257BB66C6 | 1083992F1 |
| 29 | 375C4F5AB | 3C0F5A212 | 0EA21BC30 | 13E8A26F2 | 17C039773 | 283AD6662 | 1F63AB833 | 2DE933CAF |
| 30 | 2B773E3C5 | 3849BBE6C | 1CAD2E5AB | 0405FA1DE | 1B27B4269 | 3B3BF258F | 300E77286 | 39599C4B1 |
| 31 | 1E878F0BE | 0AE5267EC | 376F42154 | 1CD517CC2 | 302781C47 | 123FEC7E0 | 16664D3D8 | 24B871A55 |
| 32 | 20E200C0A | 1C94D2FF1 | 213F8F01B | 369A536E0 | 161588399 | 29389C7FC | 259855CAC | 06025DCE2 |
| 33 | 28D2E001C | 3C51C3727 | 106F37D0E | 1FB0EFDD1 | 2CD9D33C3 | 1EA190527 | 0BB5A6F9E | 074867D50 |
| 34 | 08EFC44B5 | 1B484EABE | 05FEB2DE2 | 211AF91B5 | 0CF52B1E1 | 002B5C978 | 11D6E5138 | 0D402BDD2 |
| 35 | 337C618F4 | 0A4C31DDA | 1D93003D6 | 006D7D088 | 348043A6D | 325E05758 | 2C53EEEB8 | 15ED8E614 |
| 36 | 38375C2FF | 18C78FD02 | 30C11EF53 | 3916581DD | 1B75263FF | 2D8DFD6A9 | 00C4E8482 | 1D201F96A |
| 37 | 2E10B0D05 | 2EF203893 | 2491D95F1 | 34D995B51 | 32214BDF5 | 3E45674B1 | 3E74AC66E | 1B813A999 |
| 38 | 153E7269D | 2391C7BFC | 1ADD3A595 | 0EFD3086E | 00AD88A8E | 0D8B007CA | 0F22C5F9D | 010E86385 |
| 39 | 3B58C7BFF | 0BA76496E | 3AD0B7BBF | 1D6D10FB3 | 3A607BEFC | 28F122A95 | 057950727 | 179449CB7 |
| 40 | 37AC5194A | 390BD9C00 | 3A48C0461 | 12FBCE4C6 | 2A8DD4171 | 10E9F1E34 | 251F5D167 | 1124E96B1 |
| 41 | 0FEF20C67 | 31EC9EA3F | 275B31143 | 22DA4F02B | 352C0F648 | 21FF5B9F3 | 3E5BC2372 | 0A1AE08FE |
| 42 | 080EDC49B | 17AD7F7BA | 390775B3C | 1380B00DA | 2477FF17C | 2E6D9E5AF | 05381F2DD | 26143CC17 |
| 43 | 2DB485795 | 1B3252799 | 39AD0211C | 3AAE31B78 | 30532A187 | 1C8EA5F5A | 2EA6E4D6B | 30570A2E4 |
| 44 | 11BB4F78A | 12CCE1428 | 2C67EEF99 | 20E3F841A | 20CFCD5F2 | 1618A7B94 | 111FF6092 | 2ED034E06 |
| 45 | 1C66335E5 | 0CA9B9BD2 | 3213028AE | 15542DD28 | 290F7DAE2 | 2137F02D5 | 17DF9445D | 24F162FFB |
| 46 | 360FB966B | 17D878955 | 1C1D67093 | 065B84F3A | 1A1D955E3 | 24C73C11E | 270EA9EB2 | 114DCA02C |
| 47 | 002CE84DD | 0616DD253 | 3EB188345 | 1FF852926 | 37E160F00 | 040DF51EC | 1857A33BA | 230FD8A0D |
| 48 | 233C0A71F | 22E428104 | 0325F8170 | 39566B188 | 32DA16A4A | 039FDF1DC | 27A3E946C | 0D69F26D9 |
| 49 | 0583F9F73 | 378380CB6 | 059D8A960 | 3E3442C7F | 026138ADB | 25F370F1E | 09D3EB2CC | 2D37D50C0 |
| 50 | 08DF9CC66 | 2C2E7AA8F | 3CB241ED2 | 03216B4D2 | 39736B451 | 25F6F113F | 08FD2AC3C | 1974574FD |
| 51 | 3D1FF6041 | 2CE2AB97F | 01A734F3B | 1DCF9F3C5 | 268D595CA | 1FBD2A8B8 | 0F1449F86 | 370C352FD |
| 52 | 123218E40 | 3AA057589 | 20F73A16F | 26E3BCA5F | 3A7330DC6 | 12C659384 | 39D99FF1B | 276DFC540 |
| 53 | 185AEDEA4 | 0418B3643 | 382F7700A | 3FC35ED60 | 07BA2F838 | 1BC840C93 | 2469A41EC | 0CE7B4CB0 |
| 54 | 2E194E2BF | 3302A0B28 | 1836001EE | 154A4738A | 36A3BBD72 | 23CCD0EB1 | 044B3A13B | 2B50C8057 |

TABLE 4-continued n = 0: (Segment 0)

| q/blk | A | B | C | D | E | F | G | H |
|---|---|---|---|---|---|---|---|---|
| 55 | 0B76405D3 | 231AAA728 | 0EE05E9B6 | 0093A21F2 | 2065A01D0 | 1F2B810D4 | 1082F3A73 | 1DAFEA492 |
| 56 | 07AD23A3A | 2091957F1 | 3B9D8CBF0 | 21E4160BE | 1BFB25224 | 3D9085D16 | 03076DD39 | 1DBCF8D03 |
| 57 | 226D70EBF | 3ED15246C | 364130C46 | 22F6D4AA3 | 3FCC9A71B | 3B9283111 | 0484F0E58 | 14574BD47 |
| 58 | 3F49B0987 | 305231FA6 | 0CF4F6788 | 3B9296AED | 2346190C5 | 3365711F4 | 078900D4A | 352686E95 |
| 59 | 1D62AC9A4 | 104EDD1F5 | 1B0E77300 | 1CED8E7F0 | 388E8002C | 1FE6199F4 | 02239CB15 | 1FE5D49A2 |
| 60 | 21314C269 | 28600D12A | 22E4F1BAA | 044E211B1 | 0DECFE1B4 | 3E5B208CC | 1CFC91293 | 21E7A906B |
| 61 | 02C029E33 | 1BA88BE4D | 3742AE82F | 21EF0810F | 17D23F465 | 240446FB5 | 17CCE51D9 | 2C0B0E252 |
| 62 | 16F9D2976 | 10185ECE6 | 2821673FD | 02674271C | 3A8A75B7C | 226D4BF0F | 2216004E5 | 0E8605674 |
| 63 | 06E4CB337 | 32A31755D | 062BE7F99 | 1417A922D | 2271C07E5 | 24D6111FA | 3F2639C75 | 0CE2BB3A0 |
| 64 | 18D139446 | 2426B2EA8 | 352F18410 | 1133C535E | 10CC1A28F | 1A8B54749 | 22A54A6F4 | 2F1920F40 |
| 65 | 22443017D | 2265A18F5 | 14E1DAE70 | 11AC6EA79 | 31A740502 | 3B14311E7 | 3AA31686D | 26A3A961C |
| 66 | 2018F4CA9 | 3A0129A26 | 39BDA332E | 1941B7B49 | 03BBCE0D8 | 20E65BD62 | 2E4A6EE6C | 3B095CCB3 |
| 67 | 0CC97E07D | 11371E5FF | 31DFF2F50 | 17D46E889 | 352B75BEA | 1F1529893 | 21E6F4950 | 1BD034D98 |
| 68 | 275B00B72 | 125F0FE20 | 0FB6DE016 | 0C2E8C780 | 3026E5719 | 119910F5F | 3B647515B | 1D49FED6F |
| 69 | 250616E04 | 0882F53BF | 11518A028 | 3E9C4149D | 09F72A7FB | 0CC6F4F74 | 2838C3FD1 | 08E87689B |
| 70 | 212957CC2 | 03DD3475B | 044836A0B | 2463B52C0 | 0342FB4B0 | 34AD95E9B | 2936E2045 | 3B0592D99 |
| 71 | 2922BD856 | 22E06C30C | 390070AED | 09D6DC54F | 3485FA515 | 064D60376 | 07E8288B3 | 3DD3141BF |
| 72 | 29CB07995 | 007EE4B8B | 16E787603 | 07C219E93 | 1031B93DD | 23DEFF60B | 30F1D7F67 | 0EFE02882 |
| 73 | 11F3A0A2F | 38C598A57 | 3FE72D35B | 1F655E0D1 | 0B3AC0D92 | 3430DDB1A | 3BAADBF42 | 02D6124C0 |
| 74 | 05FC8085D | 345A5C470 | 07DAAE1E9 | 0D7150B88 | 25D2A5B10 | 16F8E5021 | 3240EFC71 | 0F0F5922D |
| 75 | 399F32F6E | 2EEB17A8E | 0D61665D0 | 2138EE96F | 3F8119063 | 01B5048F7 | 27075153D | 265DF8280 |
| 76 | 3962CC581 | 2337D2983 | 286FD7BBA | 185126E0E | 1F95AD927 | 0F7EBC374 | 1E3A4B6FF | 20CA9B9BD |
| 77 | 1C85C13AF | 290C37167 | 1FDD26E8F | 0C38736B8 | 0174DB972 | 0A921E3CC | 097557C9D | 09452C1E6 |
| 78 | 2D48D6C00 | 2D9BC8DFE | 10FF1E128 | 25C96BA85 | 0FB071B8E | 0F09B3C9C | 1A3E11441 | 38EDDA03D |
| 79 | 396B88B2F | 0029F4BDB | 30D098CAD | 0D54D12CB | 1D0823F55 | 2DC53B9AA | 11BCF7438 | 6E6C091 |
| 80 | 21E03CD65 | 1A2FE5B92 | 2851F8445 | 0251E386C | 1468950D8 | 1A8B39748 | 001B42236 | 26CD82DA5 |
| 81 | 2CEA1E6BB | 006C97E74 | 00C2B887D | 23461AF95 | 0E9CB2BD2 | 0B0EA3022 | 1FB56A7A3 | 25A7FA625 |
| 82 | 208FC2A1F | 381C5733A | 03F11D7E3 | 07ED6A7B7 | 1FEC85E09 | 3D61E0440 | 356F4B1C3 | 3756E5042 |
| 83 | 2061E47F0 | 22EAA0AD3 | 24796BA65 | 3C59B4D8 | 32A75E105 | 22155381B | 23E5F041C | 155D2D7F9 |
| 84 | 381AFFB73 | 212B5E400 | 1F1FE108E | 04BF2C90D | 3C1A949D9 | 2854A9B45 | 001B09322 | 3A9372CC1 |
| 85 | 058B23433 | 0904C6684 | 158CADB9E | 11BA4B978 | 1854368F4 | 1919ECEA7 | 147F1FD34 | 2E228AA3C |
| 86 | 34857F3DB | 2CB44F7BF | 111A065D3 | 1BEAB392E | 27F081ED8 | 3E67D1186 | 0F6265AC5 | 27716FAF9 |
| 87 | 38EBB8BF1 | 32ED6E78F | 2B0BA4966 | 2188282AA | 00D49B758 | 1765BA752 | 2B50AFDCC | 068C82450 |
| 88 | 234F0B406 | 02FB239CD | 15AD61139 | 2250A5A05 | 1CD8117E0 | 0D849163F | 268C7A5A6 | 22A802020 |
| 89 | 2D0FE8D16 | 0C14E3771 | 07DE5320C | 0640C2762 | 1CBD9FF4E | 37A91986D | 2024DA401 | 164D4A84C |
| 90 | 3225B4D60 | 3013B75F2 | 2A77AE5C5 | 2C25377EE | 03C8DF835 | 346E80FCB | 116B79FA5 | 356D2B604 |
| 91 | 0D55231FD | 247907F31 | 0CFA0B049 | 36D069A95 | 10D4CDE71 | 1A32544D7 | 38336885F | 173ECC08D |
| 92 | 207420EAC | 26FCFE182 | 3FE7B31C6 | 15B320E13 | 187AA34A8 | 1B52253BF | 1FA16669D | 3725A81A5 |
| 93 | 3C9C7404A | 092B77FEB | 3B9865B46 | 349456F61 | 39B7C6A66 | 3075EC990 | 01BE637DF | 330897B17 |
| 94 | 1CA4C048D | 2B4D50621 | 2BF917627 | 3EA2CC5E1 | 33EC0A1E3 | 05FE0F747 | 349553D72 | 396077301 |
| 95 | 04CEC1C82 | 1F828DD00 | 30122C790 | 1AD8A7895 | 1CE0912C0 | 298382F37 | 2D4D33F06 | 001364B36 |
| 96 | 37F8BB035 | 2F0897994 | 333F5F096 | 0F28AB363 | 20036829F | 338017E2D | 3A5A05D76 | 0CC02E5E0 |
| 97 | 02FD351E6 | 03E316288 | 2FCAEB4F8 | 1C5A80CE3 | 3D3AC3FDD | 3E456746D | 119A5381F | 1581C894E |
| 98 | 1623B3D0F | 103224DB0 | 0FB936BC8 | 2EED7F082 | 26C91513A | 2F12E4C31 | 290F3AEF2 | 392CBFF67 |
| 99 | 02F75DE8F | 2E61A834D | 02A692866 | 1F21044A3 | 2D7881A95 | 18651EE05 | 11FE3D308 | 39EED56DA |
| 100 | 3A858659E | 2F7A87BE0 | 135FD561D | 27B3B651A | 05E131CB9 | 0D5865123 | 2CD6991E5 | 3EE6DF705 |
| 101 | 3F3B247E1 | 32D02B245 | 16B98A593 | 1E4CCFF18 | 0C4A9D285 | 06D519FE2 | 023A336CD | 1B20E999E |
| 102 | 3A9E8B49B | 239656AD1 | 3396D1C51 | 06F4DCF40 | 15D819D3F | 2A3061144 | 20BD2A33E | 2FFB139CD |
| 103 | 38622F3AF | 24BF9BB7F | 1D2729010 | 15877B93A | 00376B0E7 | 0FF064887 | 3505CFD9B | 354C366B6 |
| 104 | 2A0AB7033 | 1AFA65DE1 | 1198D0AD6 | 38E80C86A | 27693D541 | 3BB26F3D4 | 39154881C | 0E7DD6B6B |
| 105 | 1B0DE4333 | 27FE0F6D1 | 0F00B2888 | 0BDA322FF | 2759B5A4F | 0543A2D27 | 0C36DD1E5 | 04E9A262D |
| 106 | 1C7E636BF | 000E9C271 | 2B44F4F30 | 28255BF77 | 1CC4D69CE | 03F4C57B2 | 3E926D59B | 00AA39BDB |
| 107 | 1FDE98AE0 | 0CD076B07 | 171124FB5 | 33F098288 | 1E0B3043E | 39731D117 | 3E7ABC2C8 | 19CC50279 |
| 108 | 28EE855ED | 2A704C371 | 03288F4B0 | 3C83E26C2 | 0A905148B | 18C66BB94 | 1BCC32537 | 10D71AB44 |
| 109 | 26238A065 | 0FBD7BCDD | 02507CF76 | 059F69484 | 3FE0D6F77 | 2466A50DB | 3C07A75B2 | 2DC0F099E |
| 110 | 3CDCD6CBE | 1446783DA | 1626C83F9 | 2FD4C4DF3 | 13A59A2D1 | 2C903D2A3 | 0FD37F076 | 0B1039EDD |
| 111 | 043B07DD7 | 28D9C2155 | 2CCEF57A8 | 34254C1B7 | 09B933B2F | 1FA410127 | 10BD5E9E6 | 010EC6389 |
| 112 | 345E8FCAC | 226BD7EFA | 27341A51C | 2297217 | 04C297212 | 044DED8E8 | 319B3BFB8 | 37DBBBF57 |
| 113 | 16FBEFA72 | 1B5EF9484 | 2DEE7A5BF | 097695C12 | 08AEAD5E8 | 3DA7C1327 | 2B81F3E2D | 31AFBED32 |
| 114 | 3484086B1 | 2DFA56B9E | 226E8AFE5 | 285F45484 | 3E69AC8E1 | 1CB33645F | 2DE53BC30 | 2F6ED567E |
| 115 | 1117B5E7D | 122A4D471 | 1AC936544 | 267010D71 | 10428CA47 | 24B72A000 | 2E27FE185 | 1E62C1403 |
| 116 | 0B3161E37 | 038C3DC98 | 100793647 | 1A95D8D36 | 399668787 | 06C0D4922 | 25F48AA58 | 2DFFF1789 |
| 117 | 04FEF7231 | 381910B63 | 298783078 | 30CE5EC1C | 29F6F299D | 3C34CA770 | 37BAAB139 | 3D2069B65 |
| 118 | 18F644052 | 2051880EC | 23ADBF949 | 04237280A | 18304E663 | 287364EFF | 314698D78 | 149A21E51 |
| 119 | 39E14BBCB | 1DBDA9EF4 | 3ECCAD8D3 | 1BA3EF99D | 26D85CEBF | 270547292 | 0FB3C7826 | 0131E73D6 |
| 120 | 2DD6F3F93 | 0FC282088 | 14A143DDD | 0AB840813 | 0B973037C | 29535C9AB | 0DF8DA2AC | 271CBC095 |
| 121 | 1C1D063F9 | 3F4EF6DCC | 00128D932 | 145E31F97 | 0B21590D1 | 38F1602D8 | 3AC2EBB74 | 2320957C5 |
| 122 | 3383C846F | 12128F29B | 19985CE7D | 2834CBBF2 | 1E1513B3D | 364DB5800 | 33E3F46C | 01A865277 |
| 123 | 0129D260B | 238A85BA0 | 2D81AA924 | 3917048B6 | 36F857692 | 1D2F813C3 | 0505FB48B | 3DC438BC5 |
| 124 | 05E0F8BDC | 3D978C1F1 | 266F83FCA | 0E89D715A | 01821DEA4 | 12D9AE517 | 22F8EAC2C | 3C098DA58 |
| 125 | 1575D1CE9 | 26F291851 | 3A7BB6D2C | 12CC21A3A | 2975589B0 | 39CF607FF | 388ABF183 | 3D3BAAB0B |
| 126 | 101E5EC7A | 0B75BCF3B | 13ED25A86 | 35FC032B6 | 2F6209FF0 | 13C7B2041 | 1F2791466 | 3A759A6C2 |
| 127 | 1EF89091A | 11A653D2C | 223FC1F42 | 2F7B97B31 | 2CA4EE011 | 00F68767D | 10FE34682 | 018339212 |

TABLE 5 n = 1 (Segment 1):

| q/blk | A | B | C | D | E | F | G | H |
|---|---|---|---|---|---|---|---|---|
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 0B603C09E | 2D9DEA5A0 | 117AC5C94 | 2D9DEA5A0 | 0BDFF0D89 |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| 9 | 29F162A99 | 1F739A8BF | 09F684599 | 1BEC37264 | 38ED51986 | 286325300 | 344FC460A | 3907B1161 |
| 10 | 0E4616304 | 0FABDCD08 | 0F6D6BE23 | 1B0E7FEDD | 0047DE6C2 | 36742C0C6 | 2D7ABB967 | 10D5481DF |
| 11 | 32DD51790 | 237D6ACFA | 2F691197A | 16724EA58 | 149143636 | 3810C6EE1 | 3A78B3FC6 | 1B1259333 |
| 12 | 1BB0FD4D3 | 235F10A55 | 1C7302A27 | 1148B18E5 | 04F25FBCB | 2A0A8830C | 3646DBE59 | 2F25F8C30 |
| 13 | 0FB38C45B | 069DF29E9 | 00F93771B | 3AA35746D | 2CAF48FD0 | 0A42CDD55 | 19A23CE8F | 26318A30F |
| 14 | 365FBEDAC | 27710945F | 2AA367D61 | 05A484318 | 2563F27D9 | 2D37D5C00 | 287D18FBB | 3ADB44805 |
| 15 | 3038BC77D | 2A45D29EC | 156173792 | 03EC7679E | 07577E1A4 | 1B6A94A74 | 1D26E5A94 | 0FD878D5A |
| 16 | 1F22158E4 | 3F02A1D37 | 2767EC03F | 1C8CD535A | 23DA2E5AB | 2D5F25A59 | 0971AA889 | 3E78C1846 |
| 17 | 16521E709 | 12C2DB8FE | 3A596C221 | 1562D5C27 | 1D9E1F39A | 345B96872 | 301C7894E | 2797F032D |
| 18 | 2EC951A24 | 1ED768F3F | 11217930A | 39DB44855 | 36E41B3FC | 0F6E48C44 | 36254C517 | 14493C673 |
| 19 | 3EA159E72 | 24ADE96FE | 3458C73A6 | 30674E1FB | 242109AF2 | 24DAF32B6 | 24B1EDFFE | 291CB9D15 |
| 20 | 2AD0E6696 | 04F4077D9 | 1BB279A53 | 38957605B | 379B7A6A0 | 0BAD35616 | 1285EAE51 | 37425C7FF |
| 21 | 083637980 | 34F2ED66F | 282846A88 | 19D5E40A6 | 21205942C | 27AC551E9 | 0F3F4C262 | 0505FB522 |
| 22 | 3E7D64856 | 1DB0E599E | 159120A4B | 1FC788139 | 235C454FB | 3CE5B67C8 | 339EADB32 | 0F9F7DDC1 |
| 23 | 3956371B8 | 1D67BE6E5 | 1EFCF7D53 | 041A5C363 | 2E281EB3F | 00AF8A1ED | 2DE24A56F | 1332C0793 |
| 24 | 0818C47A9 | 1F945634B | 1C5ED3403 | 1043B5BF4 | 149702D22 | 024CBB687 | 34B01FA8B | 1E9F5992F |
| 25 | 3A6618167 | 3A0007886 | 3EDB5756B | 2F2FA6FCD | 21A5252B8 | 396FFAD9D | 05347B60C | 2E0ECA200 |
| 26 | 0D45F89A1 | 3F9C2C26E | 1CBCF809E | 3CBE5FCD0 | 3D2DCF245 | 14F351A1E | 224F5B3FF | 2AA6ED34B |
| 27 | 3BA85ADF8 | 282005732 | 3AD7C0223 | 2E73D1800 | 23DEA3F46 | 2275280F6 | 1586270F9 | 0CEF4287B |
| 28 | 07DFE662E | 314B74F2F | 397BDDC4E | 223A8071F | 1F5BE3BA9 | 093BB1F33 | 0FCA2D129 | 21B3526A9 |
| 29 | 39FEADC12 | 0ECE1CD67 | 206228FAA | 38FCCA606 | 0C5EEE08F | 1C1BBDD4E | 1459E42ED | 11FD64ADF |
| 30 | 2735FFB20 | 2AE9B244A | 1A5AED974 | 38FCFD5CB | 20310DB81 | 1C5FC3E24 | 19FB3BA17 | 3785BE865 |
| 31 | 24FF6B7EC | 01C682673 | 19CB14113 | 2C8CD3C2A | 066725853 | 02CD0A23B | 279B54315 | 0CD571063 |
| 32 | 015E28584 | 30B497250 | 127E9B2E1 | 2C675E959 | 05F442DEE | 394AEF6E2 | 079E5C840 | 12703D619 |
| 33 | 3CE4B1266 | 35270B10F | 03549C4B3 | 3B3E6C375 | 1DBEF270E | 0042C9737 | 049522EC6 | 24961653E |
| 34 | 34176CD90 | 2B5E9EAE1 | 1C95E3C2B | 1EF541D4D | 26D1450E6 | 3B9D895AB | 1B0C84349 | 104B6B428 |
| 35 | 07A813421 | 2B39EAADC | 33553571C | 0F8046CDF | 2CF6A7F23 | 0AE3BE8C8 | 308BFF531 | 2DBC0F9E3 |
| 36 | 168276972 | 2CF41744F | 3CF2512E0 | 0F8B68ABC | 2E609F6AF | 04E03AC8C | 0F9B66F49 | 3AFE28736 |
| 37 | 03456021F | 1982574F3 | 0BB2B3F49 | 15A4A1CDE | 15487D58E | 2907C9ABB | 15C0D2D73 | 28D8CFEC3 |
| 38 | 3D3FD677C | 33AF2628F | 3D217FDCF | 30027E85F | 0A463F23B | 2F2AE8324 | 1D1E945E0 | 2EB355D28 |
| 39 | 3BCAF9076 | 3A7D2FF70 | 3C541F38B | 249BD8A94 | 287BC4833 | 141391EB7 | 05B6443D0 | 2FEACC5E7 |
| 40 | 275F118FA | 3A96B346D | 0C713CDE5 | 02F394A28 | 3EBB1D18D | 1BE7A9FDD | 223C53CA1 | 2BF040F77 |
| 41 | 1161DE4F5 | 0544F9DB7 | 230847E45 | 322AF4E17 | 29944A0BA | 3299F1420 | 1C9405B8E | 2DBABD4CE |
| 42 | 33165C531 | 268FE9B9B | 081A914B4 | 39100772B | 27DBF03E9 | 3E3A18AB0 | 13F2D2B83 | 2CEEE5FF4 |
| 43 | 275F97006 | 0A578F2EF | 16CEE7EC8 | 38A5B0084 | 00DC9A1F5 | 1B88CFA3D | 0D8B0B8EF | 29FC4CCF2 |
| 44 | 04BBE4F2C | 1546C3988 | 237105A43 | 339042B36 | 3A5DEBE2B | 1BD09449D | 38EFF588B | 1CDD3A6C0 |
| 45 | 002E32D38 | 1E85D3125 | 3F51120D7 | 00420ED63 | 3384713AF | 1D941BD34 | 2B39EA9CF | 05B6D9E94 |
| 46 | 2B3100F7B | 335EDB2E6 | 1AC8C8EE4 | 337FF7139 | 0672D7995 | 38A54856E | 0124753F2 | 3A3560851 |
| 47 | 046207CE9 | 0FE1BC312 | 09BA5B289 | 39376EF2B | 33F826C2C | 2F6531496 | 3933B8616 | 23125B50F |
| 48 | 3E5849C45 | 01EEDB390 | 141D9A024 | 2DE07E565 | 1813D12BB | 36DB8D404 | 0E8A272AB | 3A66B71AD |
| 49 | 1A2A88A4C | 3F0C9B4DB | 266CFBDF9 | 163420CA5 | 281ABBE99 | 34771C295 | 3AC051848 | 3C53CB875 |
| 50 | 16F795184 | 3466F1FFA | 1F433B456 | 1DDF13810 | 25F58CF69 | 1DD6CFE4E | 10A236FDF | 12AE697ED |
| 51 | 1C8D17F4F | 07C43B7D1 | 1C8DAD395 | 28F6C112E | 3A336ADB3 | 0EB6889AB | 2783A6A1F | 2CDA40458 |
| 52 | 16044624E | 252AA04B2 | 11484E85C | 07F5024B7 | 286E3A67F | 2EE6BACE4 | 277F1F864 | 22F3CF57D |
| 53 | 2D1A3F4CF | 0EEB6DEC1 | 30CD76F42 | 20403D1AC | 3A72EF9B6 | 1DAAF2A39 | 03AB76CE0 | 0A2856267 |
| 54 | 0FA2A786B | 38273EDF2 | 228A45016 | 0309DF52D | 093BDAEDC | 1B11E9300 | 1DA9C5324 | 03365EB1E |
| 55 | 24DCFDC06 | 11CF909D6 | 2FF693F4C | 366338F1F | 22E641569 | 0ACA60D55 | 32D1B009E | 035472E09 |
| 56 | 17F5D6662 | 062FCF913 | 35B211035 | 21ACE73FB | 3B4148706 | 2D0CD106F | 2CAB457A4 | 103E1E49B |
| 57 | 21859E8DA | 2F1E3BD9 | 1F1014BE2 | 062A3DEB5 | 354C0C786 | 05A8982D4 | 35A758943 | 346EBA72A |
| 58 | 00CB49E5F | 211B1034A | 3A5D2DAF1 | 21D3F3EB0 | 24B2D1150 | 1097C3685 | 2AA3671CE | 0E5DC1308 |
| 59 | 24C8401BE | 217B1F994 | 1FB9664A8 | 3D5057708 | 05A506088 | 1314842B9 | 3C8657064 | 14B1FA77F |
| 60 | 2AD698E2E | 3C129D1F6 | 2C744FF4E | 1C1C052F8 | 18C38A9FE | 252168A10 | 2EB68D098 | 3A001CBD2 |
| 61 | 2AF71324C | 2BF41D408 | 0FC498E18 | 149A1A407 | 0FDC2C4A3 | 19D00C4A1 | 0F6B0DD29 | 268CF8E86 |
| 62 | 19F4D82A5 | 342C73FD5 | 0F5AEEDE7 | 21A2A8953 | 15ADB7A4E | 11DBE038D | 0A5B6634A | 0FA382B77 |
| 63 | 0A5985778 | 35AC3032D | 35691C85D | 2829D55EE | 04A3FBD8C | 2C85BFA8E | 0F459B864 | 3E878F0BC |
| 64 | 10C785EB0 | 054D4CE18 | 1BF657A8E | 101DC64EF | 0B4E3032A | 24ECFD9C2 | 00C98BE0A | 2A1F82444 |
| 65 | 300E8B09C | 31A079FB3 | 0C41DEC5F | 216CCFE4D | 226C5A693 | 3C31A41DD | 3A019974C | 23B64EAFC |
| 66 | 249BDC80F | 0316ED79E | 1E42B5567 | 0CFF04A4B | 310678563 | 34D98690B | 1E3195429 | 280966E65 |
| 67 | 359A72B64 | 186A3999D | 065825DDF | 2D28E6000 | 10964C1E1 | 1468C970E | 34C8B606A | 33CC94DB1 |
| 68 | 370B29C05 | 12841A9E8 | 2147E7160 | 1835345EE | 06DB43F37 | 33854A725 | 065E6614C | 151E2D7B1 |
| 69 | 0EAADDB27 | 004EC6DDD | 30AA39B8B | 2AEB34AD4 | 2A13D6649 | 00EC67B83 | 1176417CE | 0E3683151 |
| 70 | 0832BA87B | 3B67515B9 | 0FD34BC87 | 1688F83CB | 370B52AD5 | 3A2CD6F3F | 33AB8F461 | 37BD48546 |
| 71 | 16EA2751C | 1799D9C42 | 24055CEC9 | 226A907D4 | 133C68F80 | 22CA03BF0 | 05F723395 | 2D35008AF |
| 72 | 122A5C67D | 3E46230BC | 09F475BA9 | 15B4B6754 | 11DE75C50 | 28C17544F | 1D85FAB8D | 0D5AD9537 |
| 73 | 1C5497CD9 | 3D405F487 | 05535D737 | 06952087B | 1C4744AF4 | 3E0EF881C | 3CED3D1BB | 1D91157CE |
| 74 | 1D276153D | 14604EA77 | 1661FB979 | 3BAC5E9FB | 089F41406 | 283154122 | 2AFDCE892 | 1FD5E0810 |
| 75 | 2A620F4C2 | 0DE484180 | 2D05E6458 | 3E6D15A27 | 0A92FF0B7 | 2CBF7BF53 | 25A2F28FA | 19A10CE02 |

TABLE 5-continued n = 1 (Segment 1):

| q/blk | A | B | C | D | E | F | G | H |
|---|---|---|---|---|---|---|---|---|
| 76 | 3A77B1FBE | 2B262F810 | 2BEEA0F46 | 39706BBA2 | 09257163F | 1026D5D74 | 2E2483EBF | 1D6527C1E |
| 77 | 0DC1EBA02 | 383C59C77 | 28C7ED115 | 06FED31D4 | 16F610DC3 | 000890B82 | 2FAD16A3A | 35C9AD95F |
| 78 | 3E5C1EBE2 | 3C65A7691 | 2394005B6 | 251B1BB49 | 1F42BFA23 | 0E8608C07 | 24666F55C | 11A5214DF |
| 79 | 323E882C5 | 2DBFF5E13 | 3638BC43F | 38CC5CBB5 | 1DBF783FB | 0499418C7 | 2285E5A40 | 1A61D17E7 |
| 80 | 1E508F19D | 0CF345F97 | 0E5648601 | 0A0951DF3 | 1194EE717 | 0A6C0B374 | 03C4E19EC | 06F725799 |
| 81 | 0B54F4AEF | 186A12343 | 04C4A60C6 | 27C2CC0E9 | 3973075A1 | 392C5EEB7 | 3933C99B1 | 005F98CB2 |
| 82 | 021B6635A | 3764D0696 | 20942B266 | 0155C4EDD | 3FDBF7497 | 37356D442 | 374F3DB06 | 2718357FE |
| 83 | 120DF6F80 | 0E41F376A | 03544C7B2 | 2D6795EFD | 29E8811F1 | 1B3EFD388 | 01CA4C48D | 2067E8033 |
| 84 | 07703D649 | 35221AB50 | 22141A0D7 | 268061A59 | 2D9192B05 | 3834711FF | 3A07258C0 | 36253B5AA |
| 85 | 1C4A564C1 | 26804247A | 16A4DB29D | 0BEF93C88 | 37A3EAB6C | 25547B136 | 3FC935878 | 250E3BF1C |
| 86 | 17049BB43 | 0D6426761 | 2BF3A471E | 1665820E9 | 14412A13D | 30D5744B0 | 2ECE5CAE6 | 01395189C |
| 87 | 29615B890 | 0A2C5A664 | 216DA64F4 | 3D4AA9D2C | 07B98342C | 2603F0D76 | 0574BDFA8 | 3F9B35D5D |
| 88 | 3A0414B22 | 0A8BE885E | 155C220E4 | 2D3B17AA6 | 3017E1B48 | 26508C6C8 | 3FF25EC63 | 240EFF072 |
| 89 | 2ACD81CE3 | 0468D7943 | 2A4108121 | 1F2E8E67F | 3AB446179 | 33325CA24 | 3006DD3A5 | 1A33F3A2C |
| 90 | 2B038BAF7 | 070660C4E | 30953C7B7 | 3E7375D04 | 1D6A39944 | 001BE5C8D | 199A89253 | 0A82087BB |
| 91 | 03BF7C836 | 2CBF9FC48 | 38EAB1C98 | 11C303993 | 3D748807F | 1EBD41D17 | 351085EF2 | 1C55B94D3 |
| 92 | 116E0BE61 | 17BC8C403 | 31BD1EAA2 | 1CF87C049 | 2A41CC04D | 3883EFEC1 | 3971BBBE2 | 190CAE3B7 |
| 93 | 172799BB5 | 3301DB193 | 2480B569B | 34DBEFE9C | 003287827 | 38DAEA1CB | 0B0E25BB4 | 1972B37E3 |
| 94 | 3EF1F9EF4 | 189D8C3E0 | 1941998D3 | 259838BC9 | 28E545988 | 33BFC60D8 | 3572B10F3 | 197913B6B |
| 95 | 24CF96D66 | 285347801 | 22BC70E5E | 394231BCC | 077583F4E | 0364420AF | 278FBF5CB | 3850AFC8B |
| 96 | 1B38C4A50 | 04439E0B5 | 3A7BEB18B | 3003A36C8 | 329D5A2B6 | 1BB123AFA | 049C2CC94 | 0F604D1DC |
| 97 | 28D47EF33 | 24CF66B6B | 24B716FA9 | 34ED7F6BB | 186AE44B4 | 1380D0726 | 1CC51324E | 16BA74F62 |
| 98 | 04422E60A | 3424BA16C | 3FF1B39DD | 1A1E658F7 | 33457317D | 14E822151 | 3EC02F279 | 28593D11D |
| 99 | 0F2DF0912 | 21BBFA838 | 32D634EBF | 2061148FD | 09A565B74 | 2BCE430B7 | 34DAAD9FA | 228ADAFE5 |
| 100 | 2D7EE0544 | 25D57B7CA | 0FADAF20D | 19BAF6444 | 3A75DF1C1 | 0AD3EDD56 | 0A4D61EEA | 28C1262A5 |
| 101 | 1B6AEE253 | 0BFE02772 | 24AB19547 | 186A377A5 | 03089B4E8 | 128955F60 | 3A8DA9AC8 | 2931648B3 |
| 102 | 21BE0200F | 00F34B4F5 | 34FF3261B | 1A0E27AED | 0A821AEFB | 21B0BA404 | 1C6A644A4 | 1734EBB33 |
| 103 | 201FBFD73 | 0592E9D86 | 053D87C9D | 3CAFC7479 | 22F1BA3FA | 3DB25DD15 | 31D468990 | 22FF2B539 |
| 104 | 06C77404E | 18AE64252 | 3963D899A | 37179C0CA | 0CEAC2109 | 191E64DBB | 380B841FB | 368E1DEAA |
| 105 | 3A561759B | 156243DE8 | 04325D217 | 33993D0B0 | 0CEAC2109 | 002242D1B | 33C1D9F5E | 1EC4195D3 |
| 106 | 17D7A9B74 | 1F44ABA75 | 17B572FE3 | 096008B9B | 1F1E00AAE | 05489F7A1 | 17A4C131D | 1C018E923 |
| 107 | 0A4ACCEC8 | 1F294A30D | 19CAEE64E | 002787A1B | 03EB3238D | 27C10F626 | 1C9E656A0 | 3F73609F0 |
| 108 | 1E0E3C802 | 1B52D12AA | 2F4E003B7 | 23BA7A6F1 | 3CAA0998A | 32E96C916 | 168EFA1EE | 28147EE33 |
| 109 | 1CEC9799E | 215D9302B | 176BB6639 | 003D5E371 | 12FE4ADB3 | 3106B64E2 | 001D9C28E | 0F39059DC |
| 110 | 31570792D | 2260D7FEF | 1AC830374 | 118FE7C78 | 08F982159 | 23BB2B13A | 2C7944305 | 376396F3C |
| 111 | 2D340540B | 272E94D06 | 097C70995 | 0E70DDADA | 1DBD644E5 | 341A72A58 | 01CBF5334 | 2C7999AF9 |
| 112 | 3FF17764D | 0701DFAD3 | 146BDBB97 | 229D2D7F0 | 03C5DA21D | 3A5916EC7 | 2390AC01D | 197D64233 |
| 113 | 3E9759D5A | 00B237425 | 0B7E646B9 | 190CB4D16 | 2646AA1D4 | 1A373103D | 337E5EFB1 | 0199DE4A1 |
| 114 | 3FD5ADE8A | 26B843860 | 0A2D0AA7B | 3C351E07F | 1B25376AE | 05C553CDD | 1DBC3F38D | 019823A2A |
| 115 | 30FF187B4 | 112F9D7A1 | 1AE977517 | 3760AF555 | 004F86368 | 3700975C2 | 0518029DE | 032427D9B |
| 116 | 3A86D49BB | 057E649D8 | 2FDE33D7E | 31254217C | 30E05CE12 | 10BCC1CD7 | 1889C5139 | 38A163ECF |
| 117 | 2610F5174 | 02A7ACB27 | 208B84FF0 | 14609CA80 | 0F3526318 | 38EBC7384 | 287C57BAA | 279661A9C |
| 118 | 014F6D77B | 1036B3D2C | 294F1999A | 33A059187 | 26CCE0507 | 180DF3129 | 00A6CAE22 | 2AC0F23A2 |
| 119 | 347C62997 | 1912A710D | 2260C531F | 2F54BBEBB | 0A2D90305 | 1BBEE20E4 | 0AF79997E | 2376F3D0F |
| 120 | 04484EB82 | 181977944 | 1C1CC2693 | 227ECAB0F | 23F32982B | 19E2F290C | 1BA2300F8 | 0EFB06247 |
| 121 | 0EC048AD8 | 3B2168495 | 34FC02DA1 | 2C0CDEF52 | 0553CA222 | 25DFA4581 | 29CF66B6B | 0AB9C21CD |
| 122 | 2AF502148 | 3B00632F9 | 387CDC4BF | 3F8B9F716 | 19084CD65 | 0354918C7 | 39D1FD9AA | 0F5ABDB77 |
| 123 | 2C6E2557A | 3E8A19D6B | 3E6756A28 | 237E65BF | 2AC457004 | 1D52401AD | 0237F1D80 | 0FB2B335D |
| 124 | 228F4B540 | 07532BF5D | 101F67F52 | 29D8598EE | 0421A0E23 | 2D89C2AFF | 0963D2F3B | 24C472A63 |
| 125 | 0CF3598E8 | 196A40BD2 | 00E63B26D | 088A0BFCA | 1C78E9016 | 03835236C | 33071A836 | 3949DC586 |
| 126 | 3E815D747 | 1588D4E96 | 073C8D44A | 303281AE4 | 095D31EC8 | 1F10F69DC | 200F057D8 | 1F270128F |
| 127 | 34F9ACB6B | 384870FF1 | 257A863DE | 34B36BA0F | 3FA3D216B | 27425041B | 0E0DD0BAD | 2E95AD35D |

TABLE 6 n = 2 (Segment 2):

| q/blk | A | B | C | D | E | F | G | H |
|---|---|---|---|---|---|---|---|---|
| 0 | 13F99E8EC | 3CF776C2A | 3300A482C | 0B2BF4791 | 17BECDFE8 | 35998C6D4 | 05F8CB75C | 259B90F0B |
| 1 | 116913829 | 05188F2A4 | 2DB0A8D00 | 2F770FE4A | 185BE5E33 | 0F039A076 | 212F3F82C | 116635F29 |
| 2 | 004EE1EC6 | 18EF4FDD9 | 26C80900E | 1A63FB8A7 | 1DAA917D4 | 0E6716114 | 02690646D | 0CC94AD36 |
| 3 | 06D4FF377 | 2716E8A54 | 16A1720C8 | 08750246F | 393045CCB | 1DBCCDE43 | 114A0CAD6 | 181690377 |
| 4 | 3DC4EF347 | 1F53452FC | 01584B5D3 | 1D96034F | 1FA62568E | 11974FACA | 191BE154D | 397C9D440 |
| 5 | 05A1B6650 | 29835ADAD | 2F6DDABE4 | 0976A607B | 11BA92926 | 2456B1943 | 3E3FD608B | 095E7584B |
| 6 | 00CC66282 | 0560BE767 | 21EBAA7C6 | 2D8E9ACE3 | 198A9E285 | 05F3E73DD | 13DA751A2 | 176B75E43 |
| 7 | 03D08ADC1 | 2254606FC | 3C695D892 | 1DA9E0280 | 2CD4FF589 | 19B78A5A4 | 0CE67A7C6 | 12535A61C |
| 8 | 0984647CF | 0822BA46B | 3EB2BC956 | 212596F54 | 11CC2E64E | 120BADF9F | 0DA72CEDE | 30D0E106F |
| 9 | 083CE5726 | 1F05DA925 | 169D93EF6 | 1FCADF3D3 | 08A5CF0BC | 317C8508F | 19BDCCFE7 | 0FACE3631 |
| 10 | 27583A466 | 1CB1634D5 | 03C7849F7 | 38C6CED00 | 1161C173A | 15A645D3E | 281A7ED92 | 076ADA797 |
| 11 | 33BA1AE8F | 187F578EE | 32473D69A | 2458B703B | 267E59071 | 0F317883B | 3E7DEDBF1 | 3B9859BA7 |
| 12 | 0322609A3 | 20C4C957C | 3FD638746 | 3FB716D79 | 36BD0CF1C | 333B11B8F | 0027ED1F2 | 3E7471BF3 |
| 13 | 3529922B1 | 0ECECBE04 | 1980B9B9E | 38D60363F | 18904BCED | 108E3E5F1 | 34B95C446 | 338F51DAC |

TABLE 6-continued n = 2 (Segment 2):

| q/blk | A | B | C | D | E | F | G | H |
|---|---|---|---|---|---|---|---|---|
| 14 | 21FD50527 | 0EA2F7A31 | 1E294A159 | 114734A02 | 120B90BF3 | 3F3617C92 | 0129071E2 | 106640936 |
| 15 | 2B59354BB | 275BF9761 | 39C6FF332 | 2004B3902 | 053F9DCB0 | 19D79A902 | 2B3125038 | 20649B43E |
| 16 | 03A8A7A2B | 091AE6721 | 18651FD9E | 1F5415ECD | 1B38EA62E | 07FB0F422 | 3EB58896B | 077FE4C7C |
| 17 | 06A13CB38 | 340099B18 | 2AE6D6385 | 1669631F9 | 28E51A676 | 19A023391 | 261855F39 | 3E518F0BC |
| 18 | 2A88F831B | 09D295831 | 294C468DF | 1477F0A13 | 37725C6EB | 00E7DB222 | 27D610157 | 349A8FAB6 |
| 19 | 163E1C44D | 3F98B6F4A | 1805538DD | 01EE3DB4A | 22AA1797E | 27568753E | 16090F219 | 2C9838C01 |
| 20 | 34B0543DC | 121B8EA82 | 00873B4A0 | 220FE7C05 | 2EDBEAE34 | 1104BDB93 | 0711E8C0E | 0E1C107BD |
| 21 | 226183AFF | 15643DE71 | 04A4CDECB | 2E67FDF8A | 26D2A6D40 | 25E7695F1 | 1A99778F5 | 20FE0C1A3 |
| 22 | 0F7EAC09D | 12BB72B2A | 182E44301 | 2962EB85A | 3477C1B69 | 3E3CF56F7 | 29C9D00C6 | 39788600C |
| 23 | 31084BEB5 | 1DC90E345 | 391736CC1 | 3C8292AE1 | 38A0D515C | 3977012F6 | 25D1F6055 | 36A7D3F8B |
| 24 | 229D3ABAC | 1044BA05F | 0C391B88A | 0636A90A6 | 0B14322AB | 21ADC33E4 | 2DC1A3BFE | 0D7FF6D1F |
| 25 | 33C85B393 | 37BFA31B6 | 134F872F0 | 0C5EA36E1 | 286956ED1 | 1632092FA | 382B4BB10 | 23DC3EF14 |
| 26 | 38E8B9BF6 | 0A0CE666B | 207D98054 | 23FF360AD | 121BFDA4E | 347D442FD | 242922C07 | 23C6E4115 |
| 27 | 263EA8516 | 36138BD6A | 0ED9C55E7 | 3F0937876 | 03232BC24 | 18E5FFF26 | 3530CF206 | 3981B7414 |
| 28 | 1D9AC2E79 | 051B220E9 | 3F3B09EC8 | 0D3F6C366 | 0201A7CB9 | 3D5477092 | 22185FF9F | 1C5AA5348 |
| 29 | 208D85694 | 22104E7C5 | 14BCFD3DD | 3592DF665 | 1F4EC3265 | 24358076A | 2D20A8000 | 017F2D489 |
| 30 | 36B3A9A2C | 3F8E0F162 | 13ACDCCF2 | 16951F727 | 271E73555 | 1B3EDCDE7 | 162B45352 | 1CAFA635A |
| 31 | 2D30FE705 | 3EC9BFC8D | 1B10F8349 | 34F973F31 | 1CA96A349 | 1A28B4543 | 1C5367CE6 | 2DFAB0AE7 |
| 32 | 21D93EB5A | 0E49D6211 | 3C6FCF774 | 09F44CACF | 2D8CD2BEA | 037DDAD3D | 3BBD06D1D | 39CBB996F |
| 33 | 159B1F948 | 0183E8DCD | 3A484866C | 21F8DF1A5 | 219A58193 | 2D1B3C399 | 2275F19BA | 0EFF4C612 |
| 34 | 22EB93A82 | 15047E272 | 15428D77B | 38FFC612E | 20609BE54 | 3226C8254 | 3E5568DB2 | 159284EED |
| 35 | 34529707C | 2E84585F4 | 20DFFB4C5 | 28288AA00 | 10EFC1E07 | 3C4D211FC | 379087C3F | 25716A7DD |
| 36 | 20106354F | 22AEB9FD7 | 3A6BAC67D | 3126294C6 | 0FBC874AC | 2DFE5675A | 391B1DDAA | 06BAA74D8 |
| 37 | 348F831C5 | 2E44BF3C2 | 3D9F6F454 | 20746A30E | 08D183029 | 35C6BFEA7 | 2729B552B | 263BB2EBD |
| 38 | 202D7F08F | 0DBE1C144 | 132F4EC09 | 184CD9B93 | 2596F5884 | 2A55B8217 | 2BEAE02D8 | 235A19A43 |
| 39 | 2DDE3FF5F | 23932555C | 001ED92D7 | 22FCD3D60 | 2C0737593 | 0B27E62FF | 0693CFBDC | 284D5B33F |
| 40 | 1DB9AB8E9 | 2995EE0A1 | 1ACFE9892 | 0D41BCB9D | 2E3806507 | 25CCD5D60 | 3536DF04C | 0BB0A5E3B |
| 41 | 3FFD4DD82 | 3E69CC1C1 | 2BC30FB74 | 3462F70FC | 164FAE762 | 09B83F8AD | 1DF593F3C | 2DB478034 |
| 42 | 16E24E9B6 | 0A9FCFBD2 | 3A018544C | 1ED8E2855 | 2D7681E4 | 05950E1F8 | 1107DA097 | 377A25C65 |
| 43 | 03C9318B8 | 0C70A7749 | 0D58708C2 | 0CA2808C4 | 219E02554 | 39315B2F2 | 2E089B00F | 302E135C7 |
| 44 | 04DC211E8 | 1DD20A505 | 21A50649F | 2CA438C04 | 39CAD66AE | 2E1BD969F | 002748760 | 069924211 |
| 45 | 2E84BCF09 | 226F5D43C | 37BE7EB10 | 07CDC854A | 06FB50D48 | 08966435B | 01BA5E5D2 | 1D34057FA |
| 46 | 2D8DFD565 | 0A30D633F | 33F93B7C6 | 0B330E9D2 | 0E659B262 | 130669024 | 19A9D5F64 | 38059132D |
| 47 | 17E4777AE | 1308F9046 | 2F7C0483E | 1859E0943 | 0982C9101 | 05453D92C | 001F53877 | 388A571AB |
| 48 | 00D29CC63 | 0A6D3BDED | 1CA44D2AF | 388C002CA | 2A3D70EF7 | 2DD3F5A6F | 39FEAF0B6 | 11DFE385F |
| 49 | 3E3A6CEC4 | 122F5E8BE | 360B96301 | 0632CF244 | 2E8985A9F | 0FD256C87 | 0449C29D4 | 26B713C90 |
| 50 | 238150687 | 3D96F7F7B | 0091E6D18 | 21802352A | 02F7A466E | 0A5BB6648 | 350DA85DB | 1C97F4544 |
| 51 | 306BA76DE | 379A88697 | 3F0DA31E1 | 0EBF48C71 | 27F8A46EB | 3F75A19F6 | 277002F97 | 275B43715 |
| 52 | 24D946CC1 | 38DF102DC | 3EFE1F5B3 | 3C316E148 | 2735B20CF | 0688E430F | 0316DC923 | 24919BEA1 |
| 53 | 0EEAF72D2 | 3C7248573 | 1087A7BD6 | 08EDA9BF6 | 2B5D97BF4 | 26733DC60 | 1190D275B | 2EC7ABD30 |
| 54 | 37C6AB63E | 2FFC9C790 | 02CAA37A7 | 1B34A3F84 | 0022CD5F6 | 3ECF891BF | 193D545E2 | 0172C674E |
| 55 | 0848A41C3 | 1D8150EE7 | 3D8A8549A | 2595F707B | 00640B276 | 2D44EBDAE | 1CAF37453 | 377EF590A |
| 56 | 16B7A5F7D | 1F5AA7998 | 382300A8B | 218916E53 | 19D00E728 | 1EDA11790 | 0BBDEF9C4 | 1DEB15796 |
| 57 | 3EFB3368D | 392AA88AD | 29CF3CACD | 03F59ED8A | 1042098CA | 1721B8F3A | 2B5DE9312 | 0CB5E6F23 |
| 58 | 1A8B0FB9E | 3FBC09C8B | 3D7F3E248 | 034C9BCB5 | 1BDD89300 | 3392476C0 | 0C10AED4B | 23BECA42A |
| 59 | 0EBC749B6 | 33453C7F6 | 304735F5C | 334628143 | 1DAF6E7A9 | 11BB9C933 | 226C5E4FF | 170372039 |
| 60 | 3F9262CBC | 0693308C8 | 21B563415 | 09BDCC403 | 0112C79D4 | 2DA9F1134 | 36AA1CD7D | 3A1608BFC |
| 61 | 218AC590E | 0FACC734D | 02132C9A3 | 27087557E | 076B3ECE7 | 2EA16BA3D | 0E1D452F1 | 3F70B027A |
| 62 | 004F9DC68 | 25BE3AD9C | 2CBD3C07B | 3F9DECD71 | 3E771E15A | 11FF2F24D | 2AEA5DF67 | 1E838955D |
| 63 | 3A04B2C376 | 1D19254F1 | 00F92D2B | 3C57484F3 | 181D0973E | 319F9CEEA | 053ADEEDB | 1A3C22150 |
| 64 | 0F78BA6BC | 2DFE0E681 | 3035BD77D | 0A0FFD148 | 275F50C66 | 2246E9053 | 27B2BF3E9 | 1741894F8 |
| 65 | 1ACCD0F79 | 22F0AEA4F | 32796ADB5 | 134A4A876 | 183D989E3 | 204C4BF97 | 22300E86F | 3F18744A3 |
| 66 | 3EB6E19EF | 1B24EAB88 | 2E318F810 | 3F07B618E | 26B4C0C87 | 31CC10EA8 | 169E1B650 | 017DF88ED |
| 67 | 2BD9E8FED | 0AB104122 | 30C9D81A0 | 09EA73C7F | 141357B1D | 000A7DB48 | 1DD06FD41 | 0AFA8EF72 |
| 68 | 19CA5678F | 28A89AA43 | 1DB945917 | 262AF69C3 | 3145A4473 | 3742CBFF5 | 1BCD965E9 | 1B0E7FC84 |
| 69 | 077838B25 | 2BF7032F8 | 23DC2E014 | 028544277 | 37B411B5F | 392F6CDC | 1D66F2BE9 | 011372DA0 |
| 70 | 39596216C | 05A651F63 | 183A6AE26 | 0D1FCA203 | 0FF6F0D22 | 2FEB8364B | 05A438ED8 | 32D045F13 |
| 71 | 3711AD513 | 290B237FF | 20E2A9B26 | 0C72A0234 | 2F1ABBE93 | 19B505378 | 354ED915D | 0C359F272 |
| 72 | 1D7786BA4 | 1CCDF053A | 36828B333 | 0ED27AFB6 | 241326FC4 | 1A9C37F8B | 0A9C3C372 | 05937E898 |
| 73 | 1053B9CDB | 040B97B1D | 0D4FF481D | 23AD465A8 | 2906EBDE2 | 0C4F6C09D | 2189C5FEA | 2D90D305A |
| 74 | 39073122B | 35FEAA236 | 1B38B7A90 | 2E02AB9F7 | 219FEEA0A | 36B3B2EF8 | 39A3F4C8B | 15A42C9DD |
| 75 | 2C6326A9E | 33F7536C1 | 2A120C75F | 37030CAA0 | 3A011882C | 098C8504E | 3B92D756B | 175811CF9 |
| 76 | 38A0F736B | 2E07B9E32 | 3B989715A | 2A646ADF4 | 2D02FE38C | 11AC7E9E6 | 3F5464862 | 0F382B0D8 |
| 77 | 26897D80C | 145B21D3E | 143F5E320 | 30549707E | 28126710C | 122CA92BE | 3AF47270C | 0B544128F |
| 78 | 00E931208 | 2E1E75EAA | 374C36E5F | 21724DFC5 | 1DFCD2028 | 1B3FF774E | 3A826A68B | 1781CDCA4 |
| 79 | 0C3D7268D | 0B7A26BF9 | 1587CE5CD | 1D04E1E60 | 36240C07D | 1AC403449 | 0417F9622 | 02B9F8BED |
| 80 | 1B569F488 | 08A3F3A46 | 2DE416045 | 1ED96E381 | 33F4F16DC | 2C8DAAE4F | 33E384AC7 | |
| 81 | 13F709786 | 02A4E32CB | 14C7F849E | 09EA16987 | 06C849EA4 | 219E4B995 | 243CB7F07 | 253513BC6 |
| 82 | 09B83FDF2 | 119D60439 | 278290BFF | 2483E6F2C | 0EDEC175D | 242A669C1 | 3EB639EF0 | 31EBB4CA0 |
| 83 | 22CAEF0E4 | 0B2FCDED0 | 19BA79607 | 343F81C7B | 289AA213E | 358AC9FFA | 23956ADA1 | 00BC725E7 |
| 84 | 1186F95E3 | 2F95F4048 | 3CFBF41E1 | 1D1E4BE96 | 26B38BA65 | 2F715E596 | 2235C0029 | 2C89AF93F |
| 85 | 33437ED6C | 12F14DB69 | 2E70F5611 | 183752704 | 142BC8B34 | 3B90ECD86 | 1C11EB493 | 1022D4782 |
| 86 | 248457F60 | 05B9A28A5 | 0A2A5DD56 | 16002D9E7 | 34C87FB16 | 2E32BAE0C | 21065BD64 | 1CCE92BB0 |
| 87 | 1DCE3941A | 1D940ACE3 | 30D331B98 | 3D5A3BAB6 | 119791607 | 10FB0D788 | 2C78E9015 | 100B598E4 |
| 88 | 39C0BC811 | 1B886594E | 27AF50C73 | 2DCEA05E6 | 0805EDCA9 | 3A5989B08 | 18AD24255 | 1683B7CF2 |
| 89 | 186A3D233 | 09E8B95DA | 1ED9F3DBE | 1B19A74F8 | 356CA7443 | 316C9FBE9 | 3F8A3162A | 3A0BC11CC |

TABLE 6-continued n = 2 (Segment 2):

| q/blk | A | B | C | D | E | F | G | H |
|---|---|---|---|---|---|---|---|---|
| 90 | 02F039B63 | 2F02D3E75 | 0F5B5E89E | 3D062255C | 222C6AA4E | 25DEA06FB | 39488C071 | 139318BFB |
| 91 | 27B5B6EE8 | 22154E0BD | 3FF7729F1 | 1052B1947 | 3D477BF2B | 3EDB6745A | 1B30CF849 | 030F84AF4 |
| 92 | 27B2D40BC | 01EE5E9B6 | 24B0ACF84 | 3370F65E0 | 067D8DFA9 | 1C01B9327 | 26FF8FDB5 | 3809C0CA6 |
| 93 | 11F581193 | 07B9B7A7D | 1CA56B4A3 | 3D088CC6C | 11D52C38A | 344760F0A | 3D3AA336D | 0118CBD93 |
| 94 | 096990784 | 2960D1672 | 3BFD7D847 | 2BC297EEE | 32168CF28 | 3912FFF6C | 08ED9BAB1 | 34452C6E5 |
| 95 | 02CD48DC2 | 186403849 | 24C6EE1EA | 12ED5268A | 2718C00E9 | 27E8F18CF | 145913E2D | 0B09009BB |
| 96 | 06B97DD08 | 2880C9B96 | 37EB87E03 | 14C4ED01D | 17041E5DC | 347A412CB | 088CE591B | 0BE926B22 |
| 97 | 116250DF7 | 1745B4329 | 1102B7093 | 1CA549C5A | 25244AB6C | 374E0F19B | 274F76015 | 0FB738F16 |
| 98 | 12841B9E9 | 1F9C4AEEB | 1445F0C98 | 39FFB6307 | 02AB688E7 | 0FD8B499E | 28D533072 | 138F162EA |
| 99 | 22BD9525E | 2030E58C6 | 25F2CD033 | 157D93437 | 1442E92D2 | 3D6EE9DF3 | 3CA5B469D | 0588A0FAE |
| 100 | 0FDEC177D | 2606157BE | 2224E556C | 0C6F33897 | 0F830DE1B | 3C3F9C1D8 | 2AF576923 | 0D4173E27 |
| 101 | 376EF82C2 | 30E3C582E | 0A82DE29A | 1B8D454D9 | 079ACE6D9 | 2579984C6 | 392F28400 | 24CEAEDF1 |
| 102 | 1CD4AA9D2 | 21DD6F4DA5 | 3485B7150 | 105DE02F9 | 22168EFCA | 24F48AA6C | 003771A39 | 306890843 |
| 103 | 1F8303786 | 2C981AAE4 | 0819F22E9 | 0A1D88D55 | 3B4C012FD | 0214CDF52 | 19DF3BE8F | 02364E19A |
| 104 | 1364A15C0 | 16E9F9961 | 17E598810 | 2654E5A2C | 09B43C7C8 | 3A5E2AF45 | 14FC71E26 | 2B4BA69F4 |
| 105 | 12E128BEF | 19166342E | 04A1404B7 | 283D17B66 | 014836F64 | 13BE0B4B5 | 2F8583C08 | 2B19A7FB4 |
| 106 | 19F83FDE2 | 361D25170 | 36354011B | 3FF4EC74B | 1B2128FF9 | 0C849EB1B | 096B991D8 | 1CA7A74AA |
| 107 | 32E0BEF35 | 11A61714D | 34C56D40B | 0742C52FE | 00ED2F1C4 | 3997FC7B7 | 06E414374 | 180DCD64F |
| 108 | 18399ED59 | 224E6C2FF | 3450F1BB7 | 27A1CA959 | 21B5E00F8 | 13B67DAE8 | 0B14C022E | 0E41BBEE2 |
| 109 | 318D94D05 | 2EBB53B17 | 331C3E6F4 | 0FBCD71ED | 380FF18B8 | 3E3C75B26 | 0E0088A18 | 17553D2A2 |
| 110 | 37AC7E5D5 | 27C9EADFA | 3FC47B5E4 | 38699BB57 | 1564F8B27 | 3579C7FEB | 13401BD88 | 0DB519DE0 |
| 111 | 0FF4D6F22 | 3C84242F3 | 2DEAE40AD | 305F320A5 | 244CB97B0 | 0892DA905 | 3F09D5CB5 | 332E7DB02 |
| 112 | 31479E580 | 1B6AD13E0 | 16A1CF9E2 | 33A0A119A | 1AC8388E9 | 3D4105F37 | 226501835 | 27AF1310F |
| 113 | 1CBDAFE39 | 3E5A30C1C | 236E9A029 | 063430D97 | 0CD91A825 | 02F335D7E | 1989FE0BE | 13C4E2A20 |
| 114 | 10B393370 | 33CB79316 | 2CEB44FC0 | 236019420 | 248F95ACB | 35034B6F0 | 365691771 | 34A8FBCB6 |
| 115 | 25463FC5F | 082FC0ED2 | 038ACE1CC | 3E959B49D | 21B8C04F5 | 08633F3A0 | 3A5D18159 | 12B3EC4C7 |
| 116 | 167B32C3E | 06FF88387 | 34C3F468B | 3239005B2 | 121C913AF | 21C90CE16 | 28B54D557 | 3811CB0A9 |
| 117 | 221BD0503 | 0AF619499 | 21F8D40C1 | 1B3DA7AEE | 3FA2E3B05 | 348466C50 | 10F12A28D | 0E70B26AB |
| 118 | 1D79A57C5 | 315D2460F | 1402B8222 | 28DC66FEA | 1BCF748F9 | 2AD5D4227 | 0094D2CAD | 25EA22A58 |
| 119 | 062B39CFB | 310E8818D | 0F2D0A235 | 3F6468866 | 33F86F342 | 39CAB5BBC | 2E7D6A8BF | 3E9218162 |
| 120 | 2FCDEA0E0 | 1BDD766A4 | 2827B99BB | 0B5F04CC9 | 1C9E02A9A | 1A6675ED4 | 033497A06 | 07D4ADD44 |
| 121 | 3CD46CD9D | 311A64A85 | 24DDFE6FF | 341106FE5 | 0D0613CDA | 0E9276056 | 178ACC4F8 | 23DEA3CB0 |
| 122 | 2762D6A40 | 306FE3843 | 1402589C8 | 382B07654 | 160BA3DEA | 3815B54C8 | 273960105 | 2076A15E5 |
| 123 | 1C593A744 | 1562487F6 | 0C38617B4 | 2CA68266A | 071C4BF93 | 2593F0BDC | 1562436E5 | 199BEEA49 |
| 124 | 35B8C7503 | 278F57EAA | 34A804061 | 19C657A74 | 385734710 | 3FAC27628 | 0707BED4E | 32F20F45E |
| 125 | 34994C46C | 1C6B99499 | 1AF24D850 | 11AD795D3 | 19288BFE9 | 1360C1B96 | 3B5D8DBC0 | 2554E72D6 |
| 126 | 22D7095A4 | 34B70502A | 3F0CB27D2 | 04FC214E6 | 24C0B80C5 | 03D6F4DC8 | 1432A099E | 26300D70E |
| 127 | 21C33416F | 18B894695 | 3AC062614 | 3537CF601 | 00A20A8B8 | 1CD10BAF5 | 394DF1DC0 | 0925851ED |

Tone-dropping technique is to make an irregular system bandwidth by dropping a specific bandwidth field based on the existing regular system bandwidth in accordance with an intention of a system provider. For example, in case of the IEEE 802.16m system, 5 MHz, 10 MHz, and 20 MHz exist as regular system bandwidths, and the system provider makes and uses an irregular system bandwidth between 5 MHz and 20 MHz by using tone-dropping technique. Such system bandwidth information can be transmitted through the aforementioned PA-preamble sequences. The PA-preamble sequences of index 3 to index 9 are occupied for the irregular system bandwidth as illustrated in Table 1.

First of all, the relation between the system bandwidth and the SA-preamble will be described.

The bandwidths of 5 MHz, 10 MHz, and 20 MHz corresponding to the regular system bandwidths are configured by one or more subbands (72 subcarriers) of four physical resource units (PRUs). In this case, subband partitioning of system bandwidths are performed based on the subbands.

Also, the SA-preamble includes subblocks (54 subcarriers) of three PRUs as a basic unit as illustrated in FIG. 6. In this case, SA-preamble corresponding to the regular system bandwidth of 5 MHz includes eight (8) subblocks (four subblocks at the left and four sublocks at the right based on the DC component), whereas SA-preamble corresponding to the regular system bandwidth of 10 MHz includes 32 subblocks (16 subblocks at the left and 16 subblocks at the right based on the DC component).

FIG. 11 is a diagram illustrating a general configuration of SA-preamble in a regular system bandwidth. In particular, (a) of FIG. 11 represents a system bandwidth of 5 MHz, and (b) represents a system bandwidth of 10 MHz.

As illustrated in FIG. 11, since the SA-preamble is transmitted by using the same bandwidth as the regular system bandwidth if no tone-dropping technique is used, it is required that subblocks allocated when tone-dropping technique is used should be corrected.

However, since granularity of the subband is different from that of the subblock, it is difficult to satisfy both granularity of the subband and granularity of the subblock when the tone-dropping technique is used. In other words, the system bandwidth is configured by subband unit after tone-dropping technique is used, so as not to affect the existing subband based permutation (subband partitioning). In this case, a process of detecting SA-preamble sequence of subblock unit may be affected. Otherwise, if the tone-dropping technique is based on granularity only of the SA-preamble, subband based permutation may be affected.

Hereinafter, system bandwidth configuration of the present invention for tone-dropping technique and SA-preamble subblock configuration according to the system bandwidth configuration will be described.

The irregular system bandwidth according to the present invention is based on granularity of subband unit. Basically, the irregular system bandwidth between 5 MHz and 10 MHz is configured by tone-dropping at the regular system bandwidth of 10 MHz, and the irregular system bandwidth between 10 MHz and 20 MHz is configured by tone-dropping at the regular system bandwidth of 20 MHz. In this case, all the irregular system bandwidths are preferably configured by granularity of 1 subband (0.83 MHz) or 2 subband (1.66 MHz). The following Table 7 illustrates system bandwidth suggested based on granularity of 2 subband and the number of subcarriers corresponding to the system bandwidth.

TABLE 7

| Index | BW (including tone dropping) (MHz) | Number of used subcarriers (including DC) |
|---|---|---|
| 0 | 5 < BW < 6.66 | 433 |
| 1 | 6.66 <= BW < 8.33 | 577 |
| 2 | 8.33 <= BW < 10 | 721 |
| 3 | 10 < BW < 11.66 | 865 |
| 4 | 11.66 <= BW < 13.33 | 1009 |
| 5 | 13.33 <= BW < 15 | 1153 |
| 6 | 15 <= BW < 16.66 | 1297 |
| 7 | 16.66 <= BW < 18.33 | 1441 |
| 8 | 18.33 <= BW < 20 | 1585 |

When the irregular system bandwidth is configured based on the regular system bandwidth, subbands located at the left edge based on the DC component may be dropped, or subbands located at the right edge may be dropped. Preferably, each of the subbands located at the left and right edges may be dropped.

Figure 12:
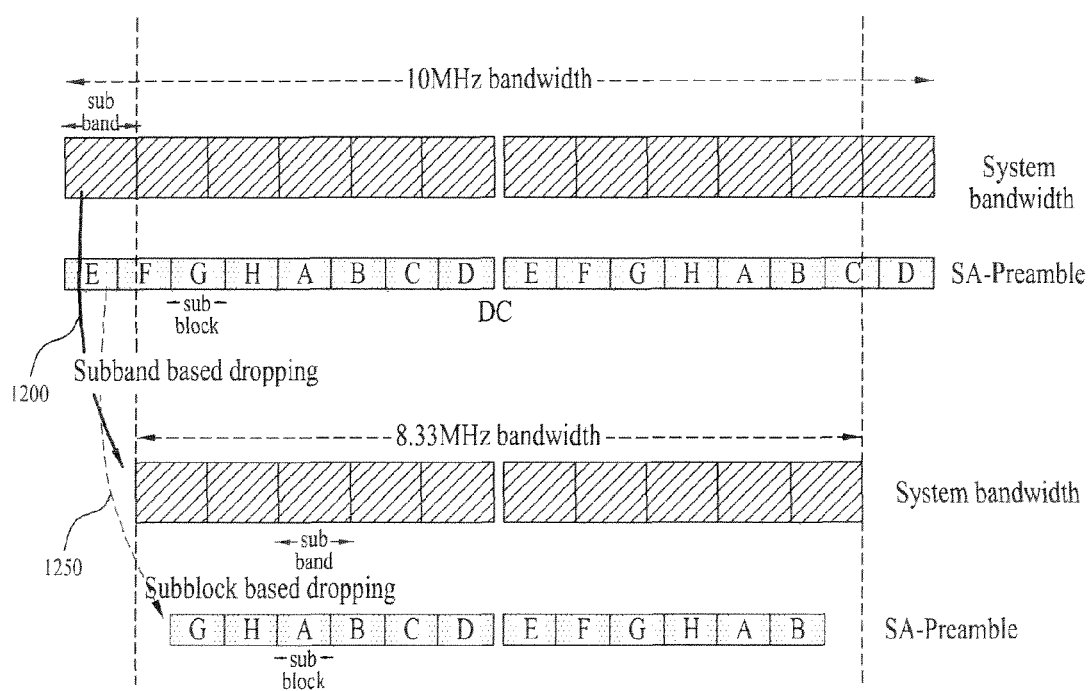
FIG. 12 is a diagram illustrating a configuration of SA-preamble sequence subblock according to the embodiment of the present invention.

FIG. 12 is a diagram illustrating a configuration of SA-preamble sequence subblock according to the embodiment of the present invention. In particular, FIG. 12 illustrates that the system bandwidth is tone-dropped from the regular system bandwidth of 10 MHz to the irregular system bandwidth of 8.33 MHz.

Referring to FIG. 12, for tone-dropping of the system bandwidth from the regular system bandwidth of 10 MHz to the irregular system bandwidth of 8.33 MHz as illustrated in reference number 1200, subbands located at the left and right edges are respectively dropped. In other words, two subbands (1.66 MHz) are symmetrically dropped based on the DC component.

Meanwhile, the bandwidth at which the SA-preamble is transmitted may be different from the irregular system bandwidth. Namely, SA-preamble sequence subblock is additionally dropped, so that the SA-preamble is transmitted at the bandwidth the same as or narrower than the system bandwidth tone-dropped in a subband unit. In other words, the minimum SA-preamble sequence subblocks located at the left and right edges are additionally dropped, so that the bandwidth at which the SA-preamble is transmitted does not exceed the system bandwidth based on the DC component as illustrated in reference number 1250.

If the bandwidth of the SA-preamble reaches a certain size, its throughput degradation may rarely occur. Accordingly, even though some subblocks are additionally dropped as illustrated in FIG. 12 to match granularity of the subblocks, no problem occurs in detection throughput of the SA-preamble sequence. In this respect, it is preferable that irregular bandwidths of the SA-preamble are configured by granularity of 2 subblock (1.25 MHz) in the present invention.

The following Table 8 illustrates irregular bandwidths at which the SA-preamble preamble suggested in the present invention is transmitted, the number of dropped sequence subblocks, the number $N_{si}$ of used sequence subblocks, and SA-preamble subblocks corresponding to the number of used sequence subblocks.

TABLE 8

| Index | Irregular BW range (MHz) | Dropped subblock(s) | Total number of subblock(s) | Allocation of sequence subblocks for SA-Preamble |
|---|---|---|---|---|
| 0 | 5 < BW < 6.25 | 0 | 8 | ABCD\|EFGH |
| 1 | 6.25 <= BW < 7.5 | 6 | 10 | H ABCD\|EFGH A |
| 2 | 7.5 <= BW < 8.75 | 4 | 12 | GH ABCD\|EFGH AB |
| 3 | 8.75 <= BW < 10 | 2 | 14 | FGH ABCD\|EFGH ABC |
| 4 | 10 < BW < 11.25 | 0 | 16 | EFGH ABCD\|EFGH ABCD |
| 5 | 11.25 <= BW < 12.5 | 14 | 18 | D EFGH ABCD\|EFGH ABCD E |
| 6 | 12.5 <= BW < 13.75 | 12 | 20 | CD EFGH ABCD\|EFGH ABCD EF |
| 7 | 13.75 <= BW < 15 | 10 | 22 | BCD EFGH ABCD\|EFGH ABCD EFG |
| 8 | 15 <= BW < 16.25 | 8 | 24 | ABCD EFGH ABCD\|EFGH ABCD EFGH |
| 9 | 16.25 <= BW < 17.5 | 6 | 26 | H ABCD EFGH ABCD\|EFGH ABCD EFGH A |
| 10 | 17.5 <= BW < 18.75 | 4 | 28 | GH ABCD EFGH ABCD\|EFGH ABCD EFGH AB |
| 11 | 18.75 <= BW < 20 | 2 | 30 | FGH ABCD EFGH ABCD\|EFGH ABCD EFGH ABC |

The structure of the SA-preamble in the multi-antenna system will be described with reference to Table 8.

First of all, if the irregular bandwidth at which the SA-preamble is transmitted is 5 MHz to 6.25 MHz, since the subblock is configured at the same bandwidth as the SA-preamble regular bandwidth of 5 MHz, antenna configuration at 512-FFT shown in FIG. 8 is used. If the irregular bandwidth at which the SA-preamble is transmitted is 10 MHz to 11.25 MHz, since the subblock is configured at the same bandwidth as the SA-preamble regular bandwidth of 10 MHz, antenna configuration at 1024-FFT shown in FIG. 9 is used.

In other cases except for the above two cases, the SA-preamble sequence subblocks are arranged at multiple antennas by the following Equation 7.

$$N_{st,k} = \left\lfloor \frac{N_{si} + N_t - 1 - \mathrm{mod}(k - p, N_t)}{N_t} \right\rfloor, \quad [\text{Equation 7}]$$

provided that $$p = \left\lfloor \frac{N_t - \mathrm{mod}(N_{si}, N_t)}{2} \right\rfloor.$$

In this Equation 7, $N_{st,k}$ means the number of SA-preamble sequence subblocks transmitted to the kth antenna, and k has an integer value between 0 and $N_t-1$. Also, $N_t$ means the number of antennas, and $N_{si}$ means the number of SA-preamble sequence subblocks used at the SA-preamble irregular bandwidths illustrated in Table 7.

Figure 13:
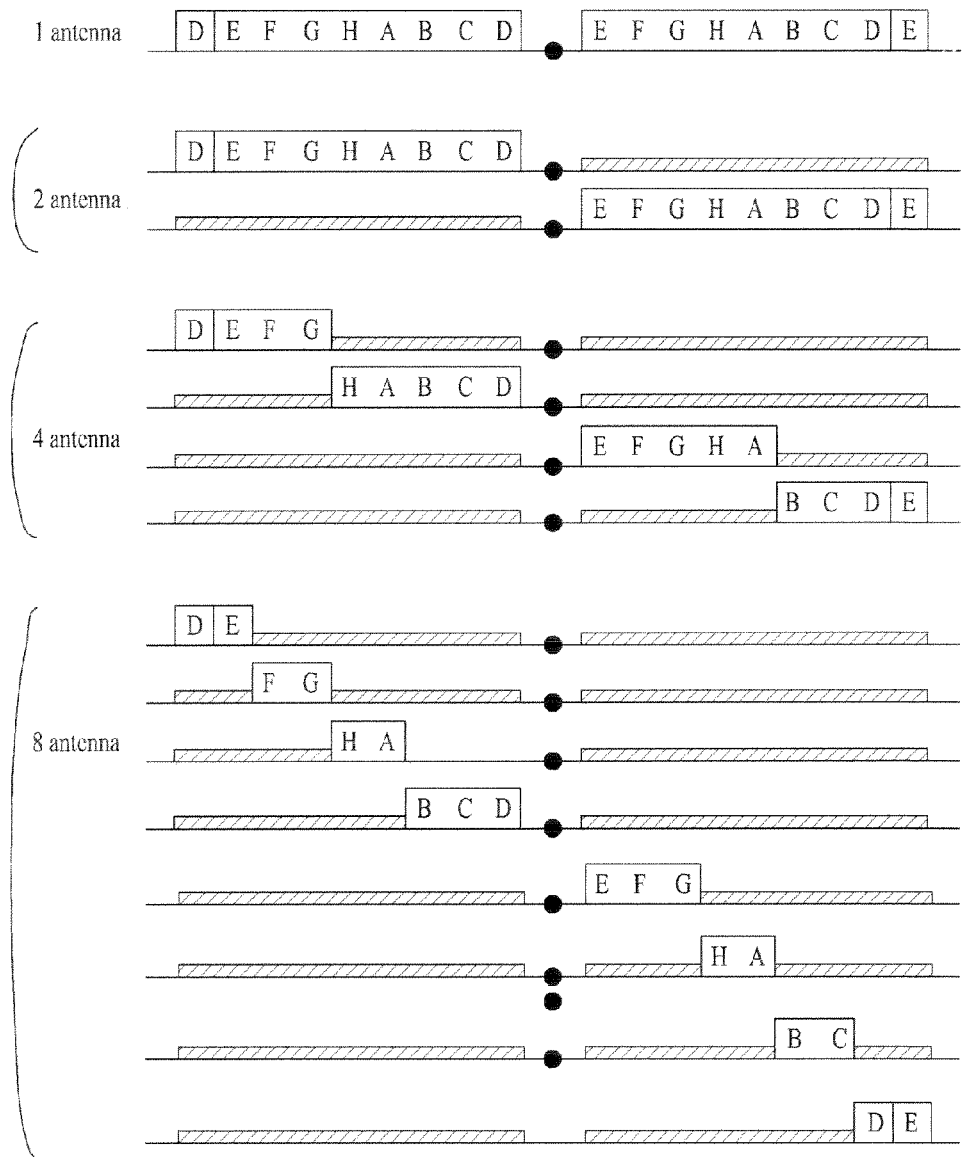
FIG. 13 is a diagram illustrating an example that SA-preamble sequence subblocks transmitted at SA-preamble irregular bandwidth are arranged at multiple antennas.

FIG. 13 is a diagram illustrating an example that SA-preamble sequence subblocks transmitted at SA-preamble irregular bandwidth are arranged at multiple antennas. In particular, FIG. 13 illustrates that the SA-preamble irregular bandwidth is 11.25 MHz to 12.5 MHz.

Figure 14:
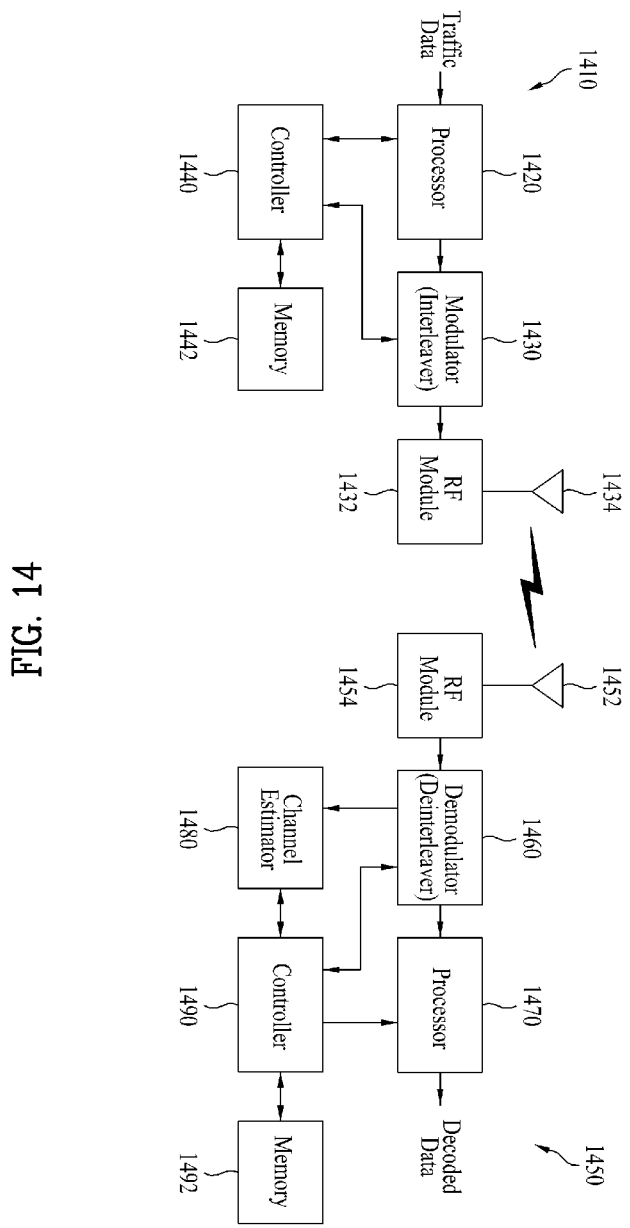
FIG. 14 is a block diagram illustrating a transmitter and a receiver according to one embodiment of the present invention.

FIG. 14 is a block diagram illustrating a transmitter and a receiver according to one embodiment of the present invention. In the downlink, the transmitter 1410 is a part of the base station and the receiver 1450 is a part of the mobile station. In the uplink, the transmitter 1410 is a part of the mobile station and the receiver 1450 is a part of the base station.

In the transmitter 1410, a processor 1420 generate data symbols by encoding, interleaving and symbol-mapping data (for example, traffic data and signaling). Also, the processor 1420 multiplexes the data symbols and pilot symbols by generating the pilot symbols.

A modulator 1430 generates transmission symbols in accordance with a wireless access scheme. Examples of the wireless access scheme include FDMA, TDMA, CDMA, SC-FDMA, MC-FDMA, OFDAM or their combination. Also, the modulator 1430 allows data to be transmitted by being distributed in a frequency domain using various permutation methods illustrated in the embodiment of the present invention. A radio frequency (RF) module 1432 generates RF signals through an antenna 1434 by processing (for example, analog conversion, amplification, filtering, and frequency uplink conversion) the transmission symbols.

In the receiver 1450, an antenna 1452 receives signals transmitted from the transmitter 1410 and provides the received signals to an RF module 1454. The RF module 1454 provides input samples by performing signal processing (for example, filtering, amplification, frequency downlink conversion, and digitalization) for the received signals.

A demodulator 1460 provides data values and pilot values by demodulating the input samples. A channel estimator 1480 estimates a channel estimation value based on the received pilot values. Also, the demodulator 1460 performs data detection (or equalization) for the received data values using the channel estimation value, and provides data symbol estimation values for the transmitter 1410. The demodulator 1460 can realign the data distributed in the frequency domain in their original order by performing the reverse operation of the various permutation methods illustrated in the embodiment of the present invention. A processor 1470 performs symbol demapping, deinterleaving and decoding for the data symbol estimation values and provides the decoded data.

Generally, in the receiver 1450, processing of the demodulator 1460 and the processor 1470 is complementary to processing of the modulator 1430 and the processor 1420 in the transmitter 1410.

Controllers 1440 and 1490 respectively manage and control the operation of various processing modules existing in the transmitter 1410 and the receiver 1450. Memories 1442 and 1492 respectively store program codes and data for the transmitter 1410 and the receiver 1450.

The modules illustrated in FIG. 14 are illustrative, and the transmitter and/or the receiver may further include necessary modules, wherein some modules/functions may be omitted or divided into different modules, or two or more modules may be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the mobile station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed Station, Node B, eNode B (eNB), and access point. Also, the mobile station may be replaced with terms such as user equipment (UE) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The present invention can be applied to a wireless communication system. More specifically, the present invention can be applied to a wireless mobile communication apparatus used for a cellular system.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmitting a secondary advanced-preamble (SA-preamble) from a base station in a wireless communication system, the SA-preamble supporting an irregular system bandwidth, the method comprising:

allocating a plurality of sequence subblocks corresponding to a regular system bandwidth;

configuring the SA-preamble by symmetrically dropping one or more sequence subblock pairs among the plurality of sequence subblocks based on a DC component; and transmitting the SA-preamble to a mobile station, wherein a bandwidth of the SA-preamble is the same as or narrower than the irregular system bandwidth, and wherein the bandwidth of the SA-preamble is configured by granularity of two subblocks of 1.25 MHz.

2. The method of claim 1, wherein the irregular system bandwidth is configured by symmetrically dropping one or more subband pairs included in the regular system bandwidth based on a DC component.

3. The method of claim 1, wherein the SA-preamble is configured based on a plurality of sequence subblocks corresponding to a regular system bandwidth of 10 MHz if the irregular system bandwidth is 5 MHz to 10 MHz and is configured based on a plurality of sequence subblocks corresponding to a regular system bandwidth of 20 MHz if the irregular system bandwidth is 10 MHz to 20 MHz.

4. The method of claim 1, wherein the SA-preamble includes the same number of sequence subblocks at both sides based on a DC component.

5. The method of claim 1, wherein the irregular system bandwidth is configured by granularity of two subbands of 1.66 MHz.

6. A base station comprising:

a processor for allocating a plurality of sequence subblocks corresponding to a regular system bandwidth and configuring a secondary advanced-preamble (SA-preamble) by symmetrically dropping one or more sequence subblock pairs among the plurality of sequence subblocks in base of a DC component; and a transmitting module for transmitting the SA-preamble to a mobile station, wherein a bandwidth of the SA-preamble is the same as or narrower than an irregular system bandwidth, and wherein the bandwidth of the SA-preamble is configured by granularity of two subblocks of 1.25 MHz.

7. The base station of claim 6, wherein the irregular system bandwidth is configured by symmetrically dropping one or more subband pairs included in the regular system bandwidth based on a DC component.

8. The base station of claim 6, wherein the SA-preamble is configured based on a plurality of sequence subblocks corresponding to a regular system bandwidth of 10 MHz if the irregular system bandwidth is 5 MHz to 10 MHz and is configured based on a plurality of sequence subblocks corresponding to a regular system bandwidth of 20 MHz if the irregular system bandwidth is 10 MHz to 20 MHz.

9. The base station of claim 6, wherein the SA-preamble includes the same number of sequence subblocks at both sides based on a DC component.

10. The base station of claim 6, wherein the irregular system bandwidth is configured by granularity of two subbands of 1.66 MHz.

11. A mobile station comprising:

a receiving module for receiving a primary advanced-preamble (PA-preamble) indicating an irregular system bandwidth from a base station and receiving a secondary advanced-preamble (SA-preamble) corresponding to the irregular system bandwidth; and a processor for determining a cell identifier of the base station by using the SA-preamble, wherein a bandwidth of the SA-preamble is the same as or narrower than the irregular system bandwidth, wherein the SA-preamble is configured by symmetrically dropping one or more subblock pairs among a plurality of sequence subblocks corresponding to a regular system bandwidth based on a DC component, and wherein the bandwidth of the SA-preamble is configured by granularity of two subblocks of 1.25 MHz.

12. The mobile station of claim 11, wherein the irregular system bandwidth is configured by symmetrically dropping one or more subband pairs at the regular system bandwidth based on a DC component.

13. The mobile station of claim 11, wherein the SA-preamble is configured based on a plurality of sequence subblocks corresponding to a regular system bandwidth of 10 MHz if the irregular system bandwidth is 5 MHz to 10 MHz and is configured based on a plurality of sequence subblocks corresponding to a regular system bandwidth of 20 MHz if the irregular system bandwidth is 10 MHz to 20 MHz.

14. The mobile station of claim 11, wherein the SA-preamble includes the same number of sequence subblocks at both sides based on a DC component.

15. The mobile station of claim 11, wherein the irregular system bandwidth is configured by granularity of two subbands of 1.66 MHz.

16. A method for receiving a secondary advanced-preamble (SA-preamble) in a mobile station of a wireless communication system, the SA-preamble supporting an irregular system bandwidth, the method comprising:

receiving a primary advanced-preamble (PA-preamble) indicating the irregular system bandwidth from a base station; and receiving a secondary advanced-preamble (SA-preamble) corresponding to the irregular system bandwidth, wherein a bandwidth of the SA-preamble is the same as or narrower than the irregular system bandwidth, wherein the SA-preamble is configured by symmetrically dropping one or more subblock pairs among a plurality of sequence subblocks corresponding to a regular system bandwidth based on a DC component, and wherein the bandwidth of the SA-preamble is configured by granularity of two subblocks of 1.25 MHz.

17. The method of claim 16, wherein the irregular system bandwidth is configured by symmetrically dropping one or more subband pairs at the regular system bandwidth based on a DC component.

18. The method of claim 17, wherein the SA-preamble is configured based on a plurality of sequence subblocks corresponding to a regular system bandwidth of 10 MHz if the irregular system bandwidth is 5 MHz to 10 MHz and is configured based on a plurality of sequence subblocks corresponding to a regular system bandwidth of 20 MHz if the irregular system bandwidth is 10 MHz to 20 MHz.

19. The method of claim 17, wherein the SA-preamble includes the same number of sequence subblocks at both sides based on a DC component.

20. The method of claim 17, wherein the irregular system bandwidth is configured by granularity of two subbands of 1.66 MHz.

* * * * *